United States Patent
Al Rawi et al.

(10) Patent No.: US 10,998,933 B2
(45) Date of Patent: May 4, 2021

(54) METHOD AND APPARATUS FOR TRANSMITTING SIGNALS OVER WIRE CONNECTIONS

(71) Applicant: BRITISH TELECOMMUNICATIONS PUBLIC LIMITED COMPANY, London (GB)

(72) Inventors: Anas Al Rawi, London (GB); Leslie Humphrey, London (GB); Trevor Linney, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 16/497,599

(22) PCT Filed: Apr. 3, 2018

(86) PCT No.: PCT/EP2018/058499
§ 371 (c)(1),
(2) Date: Sep. 25, 2019

(87) PCT Pub. No.: WO2018/178399
PCT Pub. Date: Oct. 4, 2018

(65) Prior Publication Data
US 2020/0021331 A1 Jan. 16, 2020

(30) Foreign Application Priority Data

Mar. 31, 2017 (EP) .................................. 17164439
May 26, 2017 (EP) .................................. 17173052

(51) Int. Cl.
*H04B 3/32* (2006.01)
*H04B 3/487* (2015.01)
(Continued)

(52) U.S. Cl.
CPC .............. *H04B 3/32* (2013.01); *H04B 3/487* (2015.01); *H04L 5/20* (2013.01); *H04M 11/062* (2013.01)

(58) Field of Classification Search
CPC . H04B 3/32; H04B 3/487; H04L 5/20; H04M 11/062
See application file for complete search history.

(56) References Cited

U.S. PATENT DOCUMENTS 6,507,608 B1   1/2003   Norrell
6,947,441 B1*  9/2005   Milbrandt ........... H04L 12/2803
                                                     370/430
(Continued)

FOREIGN PATENT DOCUMENTS

CN    1471791 A     1/2004
CN    1886904      12/2006
(Continued)

OTHER PUBLICATIONS

Notification of Grant dated May 4, 2020 issued for GB Patent Serial No. GB2561028 (2 pgs.).
(Continued)

*Primary Examiner* — Janice N Tieu
(74) *Attorney, Agent, or Firm* — Nixon & Vanderhye P.C.

(57) ABSTRACT

A method and apparatus for transmitting data from a transmitter device to one or more receiver devices connected to the transmitter device via a respective wire connection, the transmitter device being operable to transmit signals onto the wire connections and a further wire connection at different tones, the method comprising: for each tone, allocating signals transmitted on the further wire connection as supporting signals for a particular wire connection, and measuring electromagnetic coupling between the further wire connection and that particular wire connection; using the measurements, determining a power allocation for trans- (Continued)

mitting a supporting signal on the further wire connection; for one or more of the tones: transmitting a signal onto the particular wire connection, and transmitting a supporting signal onto the further wire connection at the determined transmission power, thereby to cause crosstalk interference in the particular wire connection.

20 Claims, 6 Drawing Sheets

(51) Int. Cl.
*H04L 5/20* (2006.01)
*H04M 11/06* (2006.01)

(56) References Cited

U.S. PATENT DOCUMENTS

| | | | |
|---|---|---|---|
| 6,961,303 | B1 | 11/2005 | Binder |
| 7,072,449 | B2 | 7/2006 | Tomilson |
| 7,388,945 | B2* | 6/2008 | Pythoud .......... H04L 1/24 379/1.03 |
| 7,561,625 | B1 | 7/2009 | Searles et al. |
| 9,270,333 | B2 | 2/2016 | Lu |
| 10,069,617 | B2 | 9/2018 | Al Rawi et al. |
| 10,097,236 | B2 | 10/2018 | Al Rawi et al. |
| 10,193,594 | B2* | 1/2019 | Al Rawi .......... H04L 5/0007 |
| 10,819,498 | B2 | 10/2020 | Al Rawi |
| 2002/0118652 | A1 | 8/2002 | Ahmed |
| 2004/0264559 | A1 | 12/2004 | Cendrillon |
| 2005/0259725 | A1 | 11/2005 | Cioffi |
| 2006/0268966 | A1 | 11/2006 | Cioffi et al. |
| 2006/0280237 | A1 | 12/2006 | Rhee |
| 2007/0263711 | A1 | 11/2007 | Theodor Kramer |
| 2009/0268601 | A1 | 10/2009 | Fang |
| 2013/0208579 | A1 | 8/2013 | Strobel |
| 2014/0185701 | A1 | 7/2014 | Liang et al. |
| 2014/0219074 | A1 | 8/2014 | Lu |
| 2014/0241384 | A1 | 8/2014 | Du et al. |
| 2014/0269947 | A1 | 9/2014 | Schneider |
| 2014/0359389 | A1 | 12/2014 | Seastrom |
| 2015/0288417 | A1 | 10/2015 | Gomez |
| 2015/0327310 | A1 | 11/2015 | Miura |
| 2017/0244446 | A1 | 8/2017 | Al Rawi |
| 2020/0028660 | A1 | 1/2020 | Al Rawi et al. |
| 2020/0350951 | A1 | 11/2020 | Stigant |

FOREIGN PATENT DOCUMENTS

| | | |
|---|---|---|
| CN | 101218776 A | 7/2008 |
| CN | 101978717 | 2/2011 |
| CN | 102820662 | 12/2012 |
| CN | 103891154 A | 6/2014 |
| EP | 1 492 261 A1 | 12/2004 |
| EP | 2 091 196 | 8/2009 |
| EP | 2 429 114 | 3/2012 |
| EP | 2 538 567 | 12/2012 |
| EP | 14 250 116 | 9/2014 |
| WO | 2006/120510 | 11/2006 |
| WO | 2013/026479 | 2/2013 |
| WO | 2013/143604 | 10/2013 |

OTHER PUBLICATIONS

Claims from granted GB Application No. GB1708449.2 (7 pgs.).
International Search Report dated Jul. 11, 2018, issued in PCT/EP2018/058500 (4 pages).
Written Opinion of the ISA dated Jul. 11, 2019, issued in PCT/EP2018/058500 (8 pages).
International Search Report dated May 7, 2018, issued in PCT/EP2018/057984 (3 pages).
Written Opinion of the ISA dated May 7, 2018, issued in PCT/EP2018/057984 (6 pages).
International Search Report dated May 7, 2018, issued in PCT/EP2018/057992 (3 pages).
Written Opinion of the ISA dated May 7, 2018, issued in PCT/EP2018/057992 (6 pages).
International Search Report dated Jul. 12, 2018, issued in PCT/EP2018/058499 (4 pages).
Written Opinion of the ISA dated Jul. 12, 2018, issued in PCT/EP2018/058499 (7 pages).
International Search Report dated May 30, 2018 issued in PCT/EP2018/058027 (3 pages).
Written Opinion of the ISA dated May 30, 2018, issued in PCT/EP2018/058027 (7 pages).
International Search Report dated Apr. 21, 2016, issued in PCT/EP2016/054167 (3 pages).
Written Opinion of the ISA dated Apr. 21, 2016, issued in PCT/EP2016/054167 (5 pages).
International Search Report dated May 7, 2018, issued in PCT/EP2018/057976 (4 pages).
Written Opinion of the ISA dated May 7, 2018, issued in PCT/EP2018/057976 (6 pages).
International Search Report for PCT/EP2016/054441, dated Apr. 21, 2016 (3 pages).
Written Opinion of the ISA for PCT/EP2016/054441, dated Apr. 21, 2016 (9 pages).
Combined Search and Examination Report dated Nov. 7, 2017, issued in GB 1708443.5 (3 pages).
Combined Search and Examination Report dated Nov. 8, 2017, issued in GB 1708449.2 (4 pages).
Combined Search and Examination Report dated Sep. 27, 2017, issued in GB 1705283.8 (2 pages).
Combined Search and Examination Report dated Sep. 28, 2017, issued in GB 1705285.3 (2 pages).
Combined Search and Examination Report dated Sep. 29, 2017, issued in GB 1705288.7 (5 pages).
Extended European Search dated Dec. 15, 2017, issued in EP 17173052.6 (10 pages).
Extended European Search dated Dec. 15, 2017, issued in EP 17173054.2 (11 pages).
Extended European Search dated Oct. 16, 2017, issued in EP 17164439.6 (8 pages).
Extended European Search dated Oct. 10, 2017, issued in EP 17164429.7 (8 pages).
Extended European Search dated Oct. 6, 2017, issued in EP 17164424.8 (8 pages).
Extended European Search dated Oct. 6, 2017, issued in EP 17164435.4 (9 pages).
Extended European Search dated Jun. 2, 2015, issued in EP 15275057.6 (10 pages).
Search Report for EP 15275058, dated Apr. 14, 2015 (4 pages).
Search Report for GB 1705286.1, dated Sep. 20, 2017 (1 page).
Office Action dated Apr. 15, 2019 issued in EP 16 707 747.8 (13 pages).
Search Report for EP 15275058.4, dated Apr. 22, 2015 (4 pages).
Mayevskiy, "Measuring crosstalk in differential signals", Nov. 1, 2004, EDN Network, 3 pages. (Year: 2004).
ITU-T Telecommunication Standardization Sector of ITU G.993.5 Series G: Transmission Systems and Media, Digital Systems and Networks, Digital sections and digital line system—Access networks Self-FEXT cancellation (vectoring) for use with VDSL2 transceivers Apr. 2010—80 pages.
Moraes, et al., "General Framework and Algorithm for Data Rate Maximization in DSL Networks", IEEE Transactions on Communications, vol. 62, No. 5, May 2014 (13 pages).
U.S. Appl. No. 16/497,557, filed Sep. 25, 2019 to Al Rawi et al. (53 pgs.).
U.S. Appl. No. 16/497,576, filed Sep. 25, 2019 to Al Rawi et al. (56 pgs.).
U.S. Appl. No. 16/497,539, filed Sep. 25, 2019 to Al Rawi et al. (52 pgs.).
U.S. Appl. No. 16/497,549, filed Sep. 25, 2019 to Al Rawi et al. (55 pgs.).
Office Action dated Jun. 23, 2020 issued in U.S. Appl. No. 16/497,549 (11 pgs.).

(56) References Cited

OTHER PUBLICATIONS

U.S. Appl. No. 16/497,557, Method and Apparatus for Transmitting Signals Over Wire Connections, filed Sep. 25, 2019.
U.S. Appl. No. 16/497,576, Method and Apparatus for Transmitting Signals Over Wire Connections, filed Sep. 25, 2019.
U.S. Appl. No. 16/497,599, Method and Apparatus for Transmitting Signals Over Wire Connections, filed Sep. 25, 2019.
U.S. Appl. No. 16/497,539, Method and Apparatus for Transmitting Signals Over Wire Connections, filed Sep. 25, 2019.
U.S. Office Action dated Feb. 9, 2021 issued in U.S. Appl. No. 16/497,539 (14 pgs.).
Office Action dated Feb. 2, 2021 issued in U.S. Appl. No. 16/497,576 (12 pages).
Lee et al., Efficient Resource Allocation for Multiclass Services in Multiuser OFDM Systems, IEICE, 11 pages, Feb. 2009.
Guenach et al., Power Optimization in Vectored and Non-Vectored G.fast Transmission, IEEE, 5 pages, 2014.
Huang et al., Fast Mitigation of Sudden Termination Changes in Wideband Wireline Systems, IEEE, 12 pages, Jun. 2016.
English translation of First Notification of Office Action dated Aug. 4, 2020 issued in CN Application No. 201680013379.7 (7 pgs.).
English translation of First Notification of Office Action dated Aug. 10, 2020 issued in CN Application No. 201680013357.0 (11 pgs.).
Office Action dated Feb. 19, 2021 issued in U.S. Appl. No. 16/497,557 (20 pgs.).
Office Action dated Feb. 1, 2021 issued in Chinese Application No. 201880022847.6 (9 pgs.) and translation (9 pgs.).
Second Office Action dated Feb. 9, 2021 issued in Chinese Application No. 201680013379.7 (4 pgs.) and translation (5 pgs.).
Office Action dated Jan. 8, 2021 issued in Chinese Application No. 201680013379.7 (2 pgs.).

\* cited by examiner

METHOD AND APPARATUS FOR TRANSMITTING SIGNALS OVER WIRE CONNECTIONS

This application is the U.S. national phase of International Application No. PCT/EP2018/058499 filed 3 Apr. 2018, which designated the U.S. and claims priority to EP Patent Application No. 17164439.6 filed 31 Mar. 2017, and EP Patent Application No. 17173052.6 filed 26 May 2017, the entire contents of each of which are hereby incorporated by reference.

FIELD OF INVENTION

The present invention relates to a method and apparatus for transmitting data from a transmitter device to a plurality of receiver devices, and in particular to a method and apparatus for transmitting and receiving data signals over pairs of wires. Such methods include all of the various Digital Subscriber Line (DSL) methods as specified in various International Telecommunications Union (ITU) standards and as being further developed in the ITU at present. Typically each such pair of wires comprises a twisted metallic pair (usually copper) as commonly found within telephone access networks throughout the world.

BACKGROUND

DSL technology takes advantage of the fact that although a legacy twisted metallic pair (which was originally installed to provide merely a Plain Old Telephone Services (POTS) telephony connection) might only have been intended to carry signals using differential mode at frequencies of up to a few Kilohertz, in fact such a line can often reliably carry signals at much greater frequencies. Moreover, the shorter the line, the greater is the range of frequencies over which signals can be reliably transmitted (especially with the use of technologies such as Discrete Multi-Tone (DMT), etc.). Thus as access networks have evolved, telecommunications network providers have expanded their fibre optic infrastructure outwards towards the edges of the access network, making the lengths of the final portion of each connection to an end user subscriber (which is still typically provided by a metallic twisted pair) shorter and shorter, giving rise to correspondingly greater and greater bandwidth potential over the increasingly short twisted metallic pair connections without having to bear the expense of installing new optic fibre connections to each subscriber. However, a problem with using high frequency signals is that a phenomenon known as crosstalk can cause significant interference reducing the effectiveness of lines to carry high bandwidth signals in situations where there is more than one metallic pair carrying similar high frequency signals in close proximity to one another. In simple terms, the signals from one channel can "leak" onto a nearby channel (which may be carrying similar signals) and appear as noise to that nearby channel. Although crosstalk is a known problem even at relatively low frequencies, the magnitude of this effect tends to increase with frequency to the extent that at frequencies in excess of a few tens of Megahertz (depending on the length of the channels in question), the indirect coupling can be as great as the direct coupling.

In order to alleviate the problems caused by crosstalk (especially Far End Cross Talk or "FEXT" as it is known) a technology known as vectoring has been developed in which knowledge of the signals sent over crosstalking lines is used to reduce the effects of the crosstalk. In a typical situation a single DSLAM acts as a co-generator of multiple downstream signals over multiple cross-talking channels and also as a co-receiver of multiple upstream signals from the same multiple cross-talking channels, with each of the channels terminating at a single Customer Premises Equipment (CPE) modem such that no common processing is possible at the CPE ends of the channels. In such a case, downstream signals are pre-distorted to compensate for the expected effects of the cross-talking signals being sent over the neighbouring cross-talking channels such that at reception at the CPE devices the received signals are similar to what would have been received had no cross-talking signals been transmitted on the cross-talking channels. Upstream signals on the other hand are post-distorted (or detected in a manner equivalent to their having been post-distorted) after being received at the co-receiver (the DSLAM) in order to account for the effects of the cross-talk which has leaked into the signals during their transmission.

SUMMARY OF INVENTION

The present inventors have realised that, as the bandwidth of DSL systems keeps expanding, the encountered loss will tend to become steeper than earlier DSL generations. Thus, flat Power Spectral Density (PSD) will tend to become extremely inefficient. This may be due, for example, to non-optimal power allocation to some frequencies. Aspects of the present invention provide a fast converging analytical water-filling algorithm that tends to overcome this problem.

The present inventors have further realised that, unlike slow/fast time varying wireless channels, Twisted Metallic Pair (TMP) channels tend to be semi-static. Thus, variability of the frequency response of TMP channels over time tends to be negligible. The present inventors have further realised that, however, with TMP channels the loss across the system bandwidth tends to be much steeper compared to wireless channels, and, as a result, aggressive signal shaping of the channel frequency response for TMP channels can be avoided. The present inventors have realised that this can be exploited to minimise the complexity of any water-filling solution.

In a first aspect, the present invention provides a method of transmitting data from a transmitter device to one or more receiver devices. Each of the one or more receiver devices is connected to the transmitter device via a respective wire connection. The transmitter device is operable to transmit signals onto the wire connections at one or more different tones. The transmitter device is further operable to transmit signals onto a further wire connection at the one or more different tones. The method comprises: for each of the one or more tones, allocating signals transmitted on the further wire connection at that tone as supporting signals for a particular wire connection; for each of the one or more tones, measuring an electromagnetic coupling between the further wire connection and the particular wire connection to which signals transmitted on the further wire connection at that tone have been allocated as supporting signals; for each of the one or more tones, using the electromagnetic coupling measurements, determining a power allocation for transmitting a supporting signal on the further wire connection at that tone; and, for one or more of the tones: transmitting a signal onto the particular wire connection that has been allocated a supporting signal at that tone; and transmitting a supporting signal onto the further wire connection at that tone, thereby to cause crosstalk interference in the particular wire connection transmitting the first signal, wherein a transmission power of the supporting signal is based on the power allocation determined for that supporting signal on the further wire connection at that tone.

Transmitting a signal onto a wire connection may comprise: determining a power for transmitting the signal on that wire connection comprising optimising a power for transmitting the signal on that wire connection based on power contributions from the supporting signals; and transmitting the signal on that wire connection at the determined power.

Measuring the electromagnetic coupling between the further wire connection and that wire connection may comprise measuring a value of a channel transfer function between the further wire connection and that wire connection.

In some aspects, the further wire connection is not connected between the transmitter device and the one or more receiver devices.

Determining the power allocation may comprises determining, for each of the one or more tones indexed by m, and for the further wire connection indexed by j, a value of:

$$s_{\hat{i},j}^m = \rho_{\hat{i},j}^m \left[ \frac{\left(1 - \beta_{\max_{\hat{i},j}}^m - \beta_{\min_{\hat{i},j}}^m\right)}{(\Omega_{\hat{i},j} + \eta_{\hat{i},j}^m)\ln 2} - \frac{1}{\gamma_{\hat{i},j}^m} \right]$$

where: m is an index for the different tones; j is an index for the further wire connection; $\hat{i}$ denotes the wire connection that has been allocated signals transmitted on the further wire connection at tone m as supporting signals; $s_{\hat{i},j}^m$ is a power allocation for transmitting a supporting signal for the $\hat{i}$ wire connection on the further wire connection j at tone m; $\rho_{\hat{i},j}^m$, $\Omega_{\hat{i},j}$, $\eta_{\hat{i},j}^m$, $$\beta_{\max_{\hat{i},j}}^m, \text{ and } \beta_{\min_{\hat{i},j}}^m$$

are variables; and $\gamma_{\hat{i},j}^m$ is a channel gain in the wire connection $\hat{i}$ caused by the further wire connection indexed by j at tone m.

In some aspects, $$\Omega_{\hat{i},j} = \frac{M}{\ln 2 \left( \frac{P_T}{\Delta_f} + \sum_m \frac{1}{\gamma_{\hat{i},j}^m} \right)}$$

where: M is the number of different tones; $\Delta_f$ is a frequency spacing between adjacent tones; and $P_T$ is the maximum power for transmitting the data.

In some aspects, $$\eta_{\hat{i},j}^m = \frac{\gamma_{\hat{i},j}^m \left(1 - \beta_{\max_{\hat{i},j}}^m\right)}{(\ln 2)(1 + p_m \gamma_{\hat{i},j}^m)} - \Omega_{\hat{i},j}$$

where $p_m$ is a power mask at tone m.

In some aspects, $$\beta_{\max_{\hat{i},j}}^m = 1 - \frac{2^{b_{max}}(\ln 2)(\Omega_{\hat{i},j} + \eta_{\hat{i},j}^m)}{\gamma_{\hat{i},j}^m}$$

where $b_{max}$ is an upper bound for a channel capacity of the wire connections.

The step of allocating signals transmitted on the further wire connection at that tone as supporting signals for a particular wire connection may comprise: for each of the one or more tones, measuring, for each of the wire connections, an electromagnetic coupling between the further wire connection and that wire connection for that tone; for each of the one or more tones, using the electromagnetic coupling measurements, identifying a wire connection that most strongly receives crosstalk interference from the further wire connection at that tone; and, based on the identifications, for each of the one or more tones, allocating signals transmitted on the further wire connection at that tone as supporting signals for a particular wire connection.

The step of allocating may further comprise determining, for each tone indexed by m, for each wire connection indexed by i, and for the further wire connection indexed by j, a value of:

$$\mu_{i,j}^m = \left(1 - \beta_{\max_{i,j}}^m - \beta_{\min_{i,j}}^m\right) \left\{ \log_2\left[\frac{\gamma_{i,j}^m\left(1 - \beta_{\max_{i,j}}^m - \beta_{\min_{i,j}}^m\right)}{\ln 2(\Omega_{i,j} + \eta_{i,j}^m)}\right] - \left[\frac{1}{\ln 2} - \frac{(\Omega_{i,j} + \eta_{i,j}^m)}{\gamma_{i,j}^m\left(1 - \beta_{\max_{i,j}}^m - \beta_{\min_{i,j}}^m\right)}\right] \right\}$$

where: $\gamma_{i,j}^m$ is a channel gain in the ith wire connection caused by the further wire connection indexed by j; $\Omega_{i,j}$, $\eta_{i,j}^m$, $$\beta_{\max_{i,j}}^m, \text{ and } \beta_{\min_{i,j}}^m$$

are variables; and the step of identifying comprises using the determined values of $\mu_{i,j}^m$.

The step of allocating may further comprise determining, for each tone indexed by m, for each wire connection indexed by i, and for the further wire connection indexed by j, a value of:

$$\Gamma_{i,j}^m = \frac{\gamma_{i,j}^m}{\gamma_{i,i}^m}$$

where: $\gamma_{i,j}^m$ is a channel gain in the ith wire connection caused by the further wire connection indexed by j at tone m; and $\gamma_{i,i}^m$ is a channel gain along the ith channel at tone m. The step of identifying may comprise using the determined values of $\Gamma_{i,j}^m$.

The step of identifying may comprise, for each of the one or more tones and for the further wire connection indexed by j, determining a value of:

$$\hat{i} = \arg\max_i \{\mu_{i,j}^m \wedge \Gamma_{i,j}^m\}$$

wherein î denotes the identified wire connection that most strongly receives crosstalk interference from the further wire connection j at that tone m.

The method may further comprise performing a water filling algorithm to jointly optimise the determined power allocation across the allocation of supporting signals to the wire connections.

In a further aspect, the present invention provides apparatus for use in a communication system, the communication system comprising a transmitter device and one or more receiver devices, each of the one or more receiver devices being connected to the transmitter device via a respective wire connection, the transmitter device being operable to transmit signals onto the wire connections at one or more different tones, the transmitter device further being operable to transmit signals onto a further wire connection at the one or more different tones, the apparatus comprising: one or more processors configured to, for each of the one or more tones, allocate signals transmitted on the further wire connection at that tone as supporting signals for a particular wire connection; and measurement means configured to, for each of the one or more tones, measure an electromagnetic coupling between the further wire connection and the particular wire connection to which signals transmitted on the further wire connection at that tone have been allocated as supporting signals; wherein the one or more processors are further configured to: for each of the one or more tones, using the electromagnetic coupling measurements, determine a power allocation for transmitting a supporting signal on the further wire connection at that tone; and operate the communication system to, for one or more of the tones: transmit a signal onto the particular wire connection that has been allocated a supporting signal at that tone; and transmit a supporting signal onto the further wire connection at that tone, thereby to cause crosstalk interference in the particular wire connection transmitting the first signal, wherein a transmission power of the supporting signal is based on the power allocation determined for that supporting signal on the further wire connection at that tone.

In a further aspect, the present invention provides a program or plurality of programs arranged such that when executed by a computer system or one or more processors it/they cause the computer system or the one or more processors to operate in accordance with the method of any preceding aspect.

In a further aspect, the present invention provides a machine readable storage medium storing a program or at least one of the plurality of programs according to the previous aspect.

BRIEF DESCRIPTION OF THE DRAWINGS

In order that the present invention may be better understood, embodiments thereof will now be described with reference to the accompanying drawings in which.

SPECIFIC DESCRIPTION OF EMBODIMENTS

Figure 1:
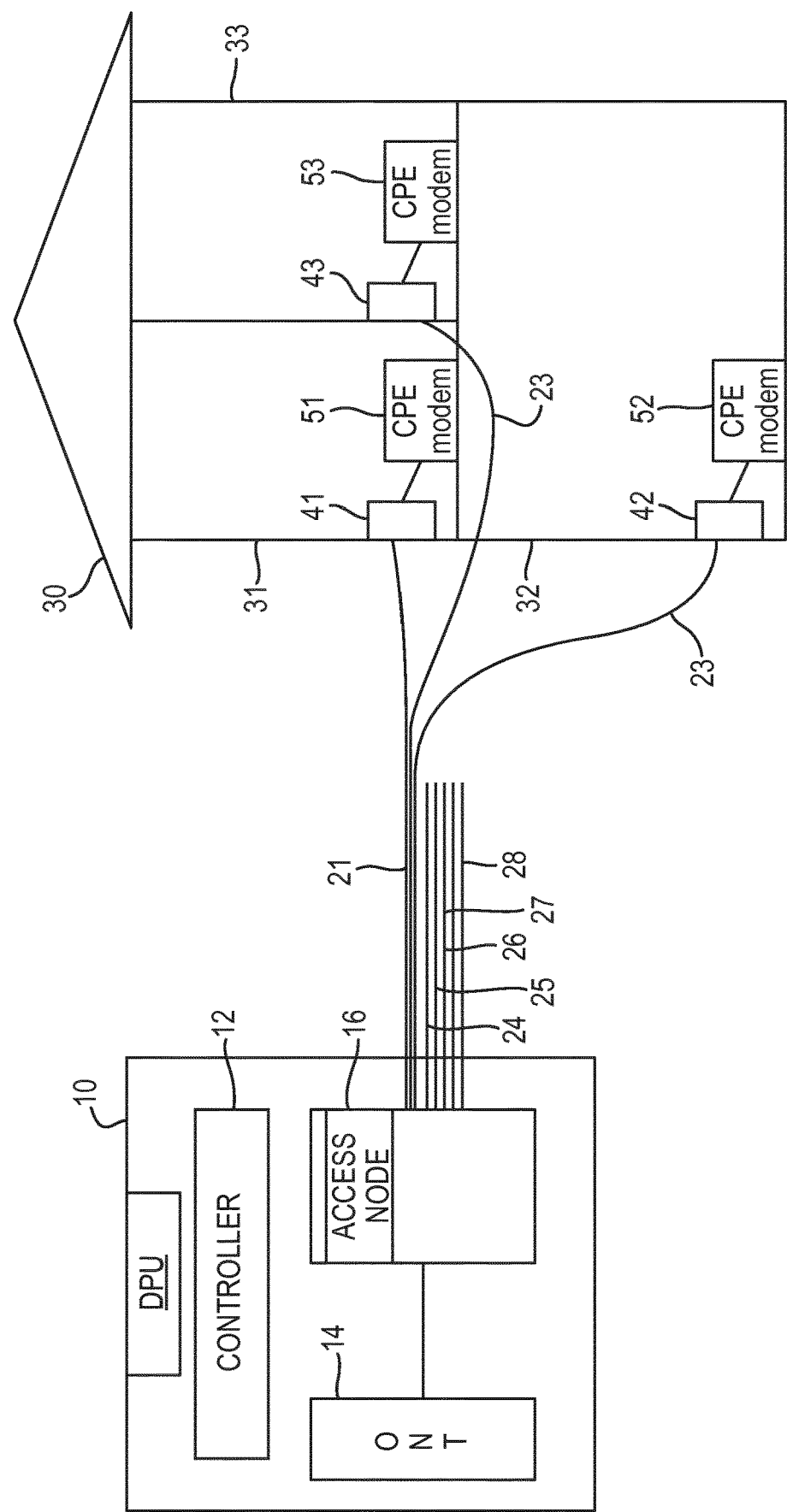
FIG. 1 is a schematic illustration (not to scale) of an example broadband deployment.

In the below description, reference will be made to modes of communication. Herein, the term "mode" is used to indicate the nature of the manner in which signals are transmitted between transmitter and receiver. In particular, as will be appreciated by persons skilled in the art, there are three principal such modes of communication: differential mode, phantom mode, and common mode. In all three of these modes the signal is transmitted (excited) and received (observed) as the (changing) potential difference (voltage differential) between two voltages (or equivalently between one "live" voltage and one "reference" voltage). In the differential mode the signal is transmitted/observed as the difference in potential between two wires (typically between two wires of a twisted metallic pair). In the phantom mode at least one of the voltages is the average voltage of a pair of wires (note that such average can vary without impacting on a signal carried in the differential mode across that same pair of wires—in this sense the phantom mode can be orthogonal to signals carried in the differential mode if carefully chosen); the term pure phantom mode may be used to specify that both voltages being compared with each other are average voltages, each average voltage being the average or common voltage of at least one pair of wires. Second and higher order phantom modes can also be obtained by using the average voltage of two or more average voltages as one of the voltages to be compared, etc. Finally, the common mode refers to the case where one of the voltages being compared is the "Earth" or ground reference voltage (or something substantially similar for telecommunications purposes). Naturally, it is possible for various mixed modes to also be used for carrying signals. For example, one reference voltage could be a common ground and the other could be the average between the voltages of two wires in a twisted metallic pair (to generate a mixed mode of phantom and common modes). However, in general, reference to a differential mode in this specification is used to refer to a pure differential mode, i.e. it does not include any phantom or common mode component so a mode comprising a comparison between the voltage on a single wire and the average voltage between the voltages of two other wires may be referred to as an impure phantom mode rather than a mixed phantom and differential mode, etc.

Phantom channels can be constructed from different combinations of TMPs. For instance, a first and a second TMP can together generate a single unique phantom channel which has a similar behaviour to that of each directly coupled differential mode channel formed across each pair in terms of channel directivity. However, phantom modes, as mentioned earlier, are due to the variation of the average voltages of the pairs. For more than two coupled pairs, the pairs may couple to each other in the phantom mode in various orthogonal and non-orthogonal manners, e.g. two distinct (but non-orthogonal) phantom mode channels may be exploited which share one common pair. Preferred embodiments of the invention select and construct only orthogonal phantom channels.

Reference is also made throughout the below description to direct and indirect coupling and direct and indirect channels. A direct channel is one in which the same physical medium and the same mode of transmission is used for both the transmission of the signal and for the reception of the signal. Thus a normal differential mode transmission across a single TMP from transmitter to receiver would constitute a direct (differential mode) channel between the transmitter and the receiver. By contrast, a channel in which the transmitter transmitted a signal onto a second TMP in differential mode but was received by a receiver from a first TMP in differential mode (the signal having "crosstalked" across from the second to the first pair) is an example of an indirect channel, as is a case in which a signal is transmitted by a transmitter in a phantom mode across the averages of the voltages of the wires in each of a first and second TMP and received (having "crosstalked/mode" converted) by a receiver connected to just the first TMP in differential mode.

Moreover, where there are multiple TMPs emanating from a single transmitter (e.g. an Access Node (AN) or Digital Subscriber Line Access Multiplexor (DSLAM), etc.) in such a way that multiple direct and indirect channels are formed between the transmitter and multiple receivers, the set of twisted metallic channel pairs and their derivative channels (direct and indirect and of various different modes) can be considered as forming a "unified" dynamic shared or composite channel over which a number of virtual channels may be overlaid (i.e. the virtual channels are overlaid over the underlying common shared channel). In this context, a virtual channel can be considered as an overlay channel by which data can be directed to individual receivers even though a single common underlying signal is transmitted onto the underlying common channel; this can be achieved for example by means of a suitable multiple access technique such as Frequency Division Multiple Access (FDMA), Code Division Multiple Access (CDMA), Time Division Multiple Access (TDMA) or simply be using suitable encryption techniques, etc.

Referring now to the Figures, FIG. 1 is a schematic illustration (not to scale) of an example broadband deployment in which embodiments of a data transmission method may be employed.

In this example, the deployment comprises a Distribution Point Unit (DPU) 10 which is connected to three user premises 31, 32, 33 (which in this example are flats within a single building 30) via respective Twisted Metallic Pair (TMP) connections, namely a first TMP connection 21, a second TMP connection 22, and a third TMP connection 23. The TMP connections 21, 22, 23 connect between an Access Node (AN) 16 (which may, for example, be a DSLAM) within the DPU 10 and respective Customer Premises Equipment (CPE) modems 51, 52 via respective network termination points 41, 42 within the respective user premises 31, 32.

In this example, the deployment further comprises a plurality of further TMP connections 24-28, namely a fourth TMP connection 24, a fifth TMP connection 25, a sixth TMP connection 26, a seventh TMP connection 27, and an eighth TMP connection 28. In this example, each further TMP connection 24-28 is connected at one of its ends to the AN 16 such that a signal may be transmitted (and/or received) along that further TMP connection 24-28 by the AN 16. Also, each further TMP connection 24-28 may be, at its end distal with respect to the AN 16, either be connected to a respective receiver (and/or transmitter), or be disconnected from any electronic device. In this example, the TMP connections 21-28 are contained within a common binder (not shown in the Figures) over at least a portion of their lengths. For example, the TMP connections 21-28 may be contained within the common binder at least between a point at or proximate to where the TMP connections 21-28 exit from/enter to the DPU 10 and a point at which the first to third TMP connections 21, 22, 23 diverge from the further TMP connections 24-28 to connect to the respective user premises 31, 32, 33. In this example, the binder is a flexible, electrically non-conductive casing or sheath (e.g. made of plastics) that surrounds, and holds together the bundle of TMP connections 21-28.

In this example, the DPU 10 additionally includes an Optical Network Termination (ONT) device 14 which provides a backhaul connection from the DPU 10 to a local exchange building via an optical fibre connection such as a Passive Optic-fibre Network (PON) and a controller 12 which co-ordinates communications between the AN 16 and the ONT 14, and which may perform some management functions such as communicating with a remote Persistent Management Agent (PMA).

As will be apparent to a person skilled in the art, the illustrated deployment involving an optical fibre backhaul connection from a distribution point and a twisted metallic pair connection from the distribution point to the "customer" premises is a sort of deployment for which the G.FAST standard is intended to be applicable. In such a situation, the TMP connections may be as short as a few hundred metres or less, for example possibly a few tens of metres only, and because of this it tends to be possible to use very high frequency signals (e.g. up to a few hundred Megahertz) to communicate over the short TMPs because the attenuation of high frequency signals is insufficient to prevent them from carrying useful information because of the shortness of the channels. However, at such high frequencies crosstalk can become a significant issue. This tends to be the case where the cross-talking channels travel alongside each other for part of their extent (as in the situation illustrated in FIG. 1); however, cross-talk is also tends to be an issue at high frequencies (e.g. over 80 MHz) even where the channels only lie close to one another for a very small portion of their total extent (e.g. just when exiting the DPU 10). G.fast proposes simply using vectoring techniques at all frequencies where there are cross-talking channels in order to mitigate against the cross-talk effects.

In some embodiments, the DPU 10 (for example, the AN 16) exploits signals (which may be considered to be supporting signals) transmitted onto the further TMP connections 24-28 and/or phantom channels which will "crosstalk" onto the conventional differential mode channels associated with each of the end user receivers (the termination point and CPE modem combinations 41/51, 42/52, 43/53), and changes the signals received (compared to a conventional case where the further TMP connections 24-28 and phantom channels are not exploited in this way). The present embodiment includes a Phantom Channel-Multiple Optimisation Problem device (PC-MOP) which, as is explained in greater detail below, acts to select, for each one of the further TMP connections 24-28 and for each tone, a particular one of the direct mode channel to that will receive crosstalk interference from supporting signals transmitted on that further TMP connection 24-28 at that tone. The selection may be performed such as to try to achieve a particular set of two (or more) objectives.

Figure 2:
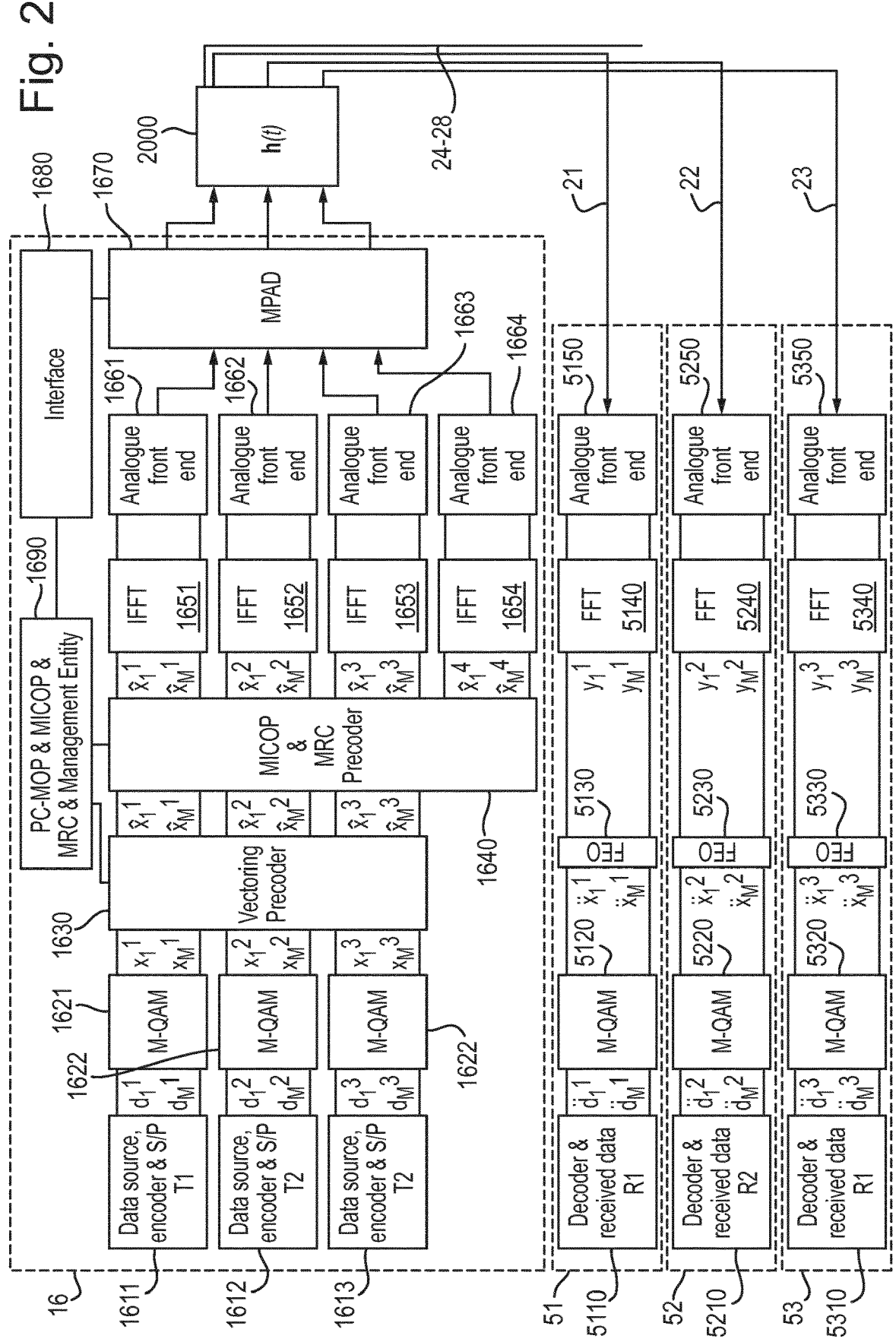
FIG. 2 is a schematic illustration (not to scale) showing further specific details of the broadband deployment.

FIG. 2 is a schematic illustration (not to scale) showing further details of the AN 16 and CPE modems 51, 52, 53 that allow for data transmission according to below described embodiments.

The AN 16 comprises first, second, and third Data Source, Data Encoder and Serial to Parallel converter (DSDESP) modules 1611, 1612 and 1613. These are essentially conventional functions within a DSL modem and will not be further described here except to point out that each one's output is a set of data values $d_1$-$d_M$ each of which can be mapped to both a set of one or more bits and to a point within a modulation signal constellation associated with a respective tone on which the data value is to be transmitted. For example, if a tone $t_1$ is determined to be able to carry 3 bits of data, a corresponding data value will be set to one of $2^3=8$ different values (e.g. to a decimal number between 0 and 7) each of which corresponds to a different constellation point within an associated signal constellation having 8 different constellation points. The data values for a single symbol can be thought of as forming a vector of data values (one for each data-carrying tone) and together carry the user data to be transmitted to the end user associated with a respective end user modem 51, 52, 53 together with any overhead data (e.g. Forward Error Correction data etc.).

The data values leaving each DSDESP module 1611, 1612, 1613 are then passed (in an appropriate order) to respective Multiple bit level Quadrature Amplitude Modulation (M-QAM) modulators 1621, 1622, 1623 which convert each input data value to a respective complex number $x_1^1$ to $x_M^1$, $x_1^2$ to $x_M^2$, and $x_1^3$ to $x_M^3$ each of which represents a complex point within a complex number constellation diagram. For example, a data value $d_1^1=7$ (=111 in binary) might be mapped by the M-QAM modulator 1621 to the complex number 1−i for tone 1 where tone 1 has been determined (by say modem 51) to be able to carry 3 bits of data each.

Each of these complex numbers $x_1^1$ to $x_M^1$, $x_1^2$ to $x_M^2$, and $x_1^3$ to $x_M^3$ is then entered into a vectoring precoder module 1630 (which in the present embodiment is a single common vectoring precoder module 1630) which performs a largely conventional vectoring operation in order to pre-code the transmissions to be sent using a combination of predetermined vectoring coefficients and information about the signals to be transmitted onto the other channels within the relevant vector group in a manner, which is well known to those skilled in the art, to compensate for the expected effects of cross-talk from the other channels in the vector group.

In some embodiments, the vectoring precoder module 1630 is operable to additionally precode the transmissions in such a way as to cause them to be pre-compensated for the expected crosstalk effects produced not only by the neighbouring channels operating in a direct differential mode (as per standard vectoring), but also for the effects of crosstalk coming from any signals being transmitted onto one or more phantom channels (or other channels which are not direct differential mode channels). In order to do this, the vectoring precoder module 1630 may receive information about channel estimations of the respective phantom channel(s) (or other channels which are not direct differential mode channels) and also information about any weighting values used to combine signals to be transmitted over the phantom channel(s) (or other channels which are not direct differential mode channels).

An ability of the vectoring precoder module 1630 to receive the weighting values and channel estimation values, which it may use to perform its precoding functions, is illustrated in FIG. 2 by the line between the PC-MOP & MICOP & MRC & Management entity module 1690 (which performs general management functions in addition to its specific functions described in greater detail below and, for brevity, may hereinafter be referred to either as the "management entity" or the "PC-MOP module") and the vectoring precoder module 1630. In this embodiment, the PC-MOP module 1690 calculates appropriate values for the channel estimations and the weighting values required by the vectoring precoder module 1630 and the MICOP & MRC precoder module 1640. To do this, the PC-MOP module 1690 may use data reported back to it from the end user modems 51, 52, 53. The processes and procedures for achieving this are largely conventional and well known to persons skilled in the art and so they are not discussed in great detail herein except to note that it may utilise a backward path from the user modems 51, 52, 53 to the AN 16. This may be achieved in practice in that the user modems 51, 52, 53 are transceivers capable of receiving and transmitting signals over the TMPs 21, 22, 23 as is the AN 16. The receiver parts of the AN 16 and the transmitter parts of the user modems 51, 52, 53 have simply been omitted from the drawings to avoid unnecessary complication of the figures and because these parts are entirely conventional and not directly pertinent to the present invention. Moreover, each of the user modems 51, 52, 53 may additionally contain a management entity responsible for performing various processing and communication functions. Any of a multitude of suitable techniques can be employed for obtaining data useful in generating channel estimations. For example, known training signals can be transmitted onto selected channels by the AN 16 during a special training procedure and the results of detecting these by the user modems 51, 52, 53 can be sent back to the AN 16 in a conventional manner. Additionally, special synchronisation symbols can be transmitted, interspersed with symbols carrying user data, at predetermined "locations" within a "frame" comprising multiple symbols (e.g. at the beginning of each new frame) and the results of attempting to detect these synchronisation symbols can also be sent back to the AN 16 to generate channel estimation values. As is known to persons skilled in the art, different synchronisation signals/symbols can be sent over different channels simultaneously and/or at different times etc. so that different channel estimations (including importantly indirect channels and indirect channels can be targeted and evaluated, etc.

In this embodiment, the output from the vectoring precoder module 1630 is a set of further modified complex numbers $\hat{x}_1^1$ to $\hat{x}_M^1$, $\hat{x}_1^2$ to $\hat{x}_M^2$, and $\hat{x}_1^3$ to $\hat{x}_M^3$. These complex numbers are then passed to a Mixed-Integer Convex Optimisation Problem and Maximal Ratio Combiner (MICOP and MRC) precoder module 1640 (hereinafter referred to as the MICOP and MRC precoder module 1640). The MICOP and MRC precoder module 1640 may be considered to be a Maximal Ratio Transmission (MRT) module. In the present embodiment, the MICOP and MRC precoder module 1640 uses weighting values together with channel estimation values provided to it by the PC-MOP module 1690 to calculate, from the modified complex numbers received from the vectoring pre-coder module 1640 (and the weighting values and channel estimation values from the PC-MOP module 1690), further modified (or further pre-distorted) values for the complex numbers to be passed to the IFFTs 1651-1652. Thus, MICOP and MRC precoder module 1640 modifies the received numbers $\hat{x}_1^1$ to $\hat{x}_M^1$, $\hat{x}_1^2$ to $\hat{x}_M^2$, and $\hat{x}_1^3$ to $\hat{x}_M^3$ to generate corresponding further modified complex numbers $\ddot{x}_1^1$ to $\ddot{x}_M^1$, $\ddot{x}$ to $\ddot{x}_M^2$, and $\ddot{x}_1^3$ to $\ddot{x}_M^3$ which form (ultimately) the signals to be used in driving the respective TMPs 21, 22, 23 in direct differential mode.

Also, the MICOP and MRC precoder module 1640 may additionally generate one or more new sets of complex numbers, for example $\ddot{x}_1^4$ to $\ddot{x}_M^4$, $\ddot{x}_1^5$ to $\ddot{x}_M^5$, $\ddot{x}_1^6$ to $\ddot{x}_M^6$, $\ddot{x}_1^7$ to $\ddot{x}_M^7$, and $\ddot{x}_1^8$ to $\ddot{x}_M^8$, for forming (ultimately) the signals to be used to drive a respective further TMP 24-28, or a respective (single ended) phantom mode channel, to be accessed via the MPAD module described below. (In FIG. 2, only one of these new sets of complex numbers, namely $\ddot{x}_1^4$ to $\ddot{x}_M^4$, is depicted for reasons of clarity and ease of understanding of the Figures. However, it will be appreciated by the skilled person that, in practice, multiple of these new sets of complex numbers may be generated by the MICOP and MRC precoder module 1640, and may then be sent to a respective IFFT module.)

Any appropriate way of generating the sets of complex numbers ($\ddot{x}_1^1$ to $\ddot{x}_M^1$, etc.) may be performed. For example, the method of transmitting data in differential and phantom modes that is described in WO 2016/139156 A1, which is incorporated herein in its entirety, may be implemented. Once these values have been calculated by the MICOP and MRC precoder 1640 they are passed to the respective IFFT modules 1651-1654, with super-script 1 values going to IFFT 1651, superscript 2 values going to IFFT 1652, and so on. The next two steps of the processing are conventional and not relevant to the present invention. Thus, each set of generated values (e.g. $\ddot{x}_1^1$ to $\ddot{x}_M^1$) is formed by the respective IFFT module into a quadrature time domain signal in the normal manner in Orthogonal Frequency Division Multiplexing (OFDM)/DMT systems.

The time domain signals are then processed by a suitable Analogue Front End (AFE) module 1661 to 1664 again in any suitable such manner including any normal conventional manner. After processing by the AFE module 1650, the resulting analogue signals are passed to a Multiple Phantom Access device (MPAD) module 1670. In overview, the MPAD module 1670 provides switchable access to centre taps of any of the TMPs such that any of the possible phantom channels associated with the connected channels can be driven by the incoming signal arriving from AFE 1664 as well as directly passing on the signals from AFEs 1661-1663 directly to TMPs 21-23 for driving in the normal direct differential mode.

During transmission over the TMP connections 21, 22, 23 the signals will be modified in the normal way according to the channel response of the channel and due to external noise impinging onto the connections. In particular, there will typically be crosstalking (including, for example, far-end crosstalking) between the three direct channels (the direct channels being one from the transmitter 16 to the modems 41-43 via the TMPs 21-23), the further channels provided by the further TMP connections 24-28, and the phantom channels. However, the effect of the precoding is to largely precompensate for the effects of the crosstalk. Additionally, the targeted receivers may benefit from increased SNR of the received signal destined for them arriving via crosstalk from one or more of the further TMP connections 24-28, and/or the phantom channel.

After passing over the TMP connections 21, 22, 23 the signals are received by the modems 41-43 at a respective Analogue Front End (AFE) module 5150, 5250, 5350 which performs the usual analogue front end processing. The thus processed signals are then each passed to a respective Fast Fourier Transform (FFT) module 5140, 5240, 5340 which performs the usual conversion of the received signal from the time domain to the frequency domain. The signals leaving the FFT modules 5140, 5240, 5340, $y_1^1$ to $y_M^1$, $y_1^2$ to $y_M^2$, and $y_1^3$ to $y_M^3$, are then each passed, in the present embodiment, to a respective Frequency domain EQualiser (FEQ) module 5130, 5230, 5330. The operation of such frequency domain equaliser modules 5130, 5230, 5330 is well-known in the art and will not therefore be further described herein. It should be noted however, that any type of equalisation could be performed here, such as using a simple time-domain linear equalizer, a decision feedback equaliser, etc. For further information on equalisation in OFDM systems, the reader is referred to: "*Zero-Forcing FrequencyDomain Equalization for Generalized DMT Transceivers with Insufficient Guard Interval,*" by Tanja Karp, Steffen Trautmann, Norbert J. Fliege, EURASIP Journal on Applied Signal Processing 2004:10, 1446-1459.

Once the received signal has passed through the AFE, FFT and FEQ modules, the resulting signals $\ddot{x}_1^1$ to $\ddot{x}_M^1$, $\ddot{x}$ to $\ddot{x}_M^2$, and $\ddot{x}_1^3$ to $\ddot{x}_M^3$ tend to be similar to the complex numbers $x_1^1$ to $x_M^1$, $x_1^2$ to $x_M^2$, and $x_1^3$ to $x_M^3$ originally output by the M-QAM modules 1621-1623, except that there may be some degree of error resulting from imperfect equalisation of the channel and the effect of external noise impinging onto the channels during transmission of the signals between the AN 16 and the modems 51, 52, 53. This error will in general differ from one receiving modem to the next. This can be expressed mathematically as $\ddot{x}_m^1 = x_m^1 + e_m^1$ etc. Provided the error however is sufficiently small the signal should be recoverable in the normal way after processing by the M-QAM demodulator modules 5120-5320 where a corresponding constellation point is selected for each value $\ddot{x}_m^i$ it depending on its value (e.g. by selecting the constellation point closest to the point represented by the value $\ddot{x}_m^i$ unless trellis coding is being used, etc.). The resulting values $\ddot{d}_1^1$ to $\ddot{d}_M^1$, $\ddot{d}_1^2$ to $\ddot{d}_M^2$, and $\ddot{d}_1^3$ to $\ddot{d}_M^3$ should mostly correspond to the data values $d_1^1$ to $d_M^1$, $d_1^2$ to $d_M^2$, and $d_1^3$ to $d_M^3$ originally entered to the corresponding M-QAM modules 1621, 1622, 1623 respectively within the AN 16. These values are then entered into a respective decoder (and received data processing) module 5110, 5210 and 5230 which reassembles the detected data and performs any necessary forward error correction etc. and then presents the recovered user data to whichever service it is addressed to in the normal manner, thus completing the successful transmission of this data.

Following now from the above overview of FIG. 2, a more detailed explanation is provided of the non-conventional elements within the embodiment illustrated in FIG. 2 and described briefly above.

In this embodiment, the PC-MOP module 1690 is a component configured to determine, for each of the supporting further TMPs 24-28, and for each tone on which data is transmitted, a receiving TMPs 21, 22, 23 to receive crosstalk interference from that supporting further TMP 24-28 to increase the SNR of a signal along that TMP 21, 22, 23 at that tone. The MPAD 1670 may also accordingly operate the further TMPs 24-28 and/or phantom channels to improve the composed active channels and hence the SNR of signals along the TMPs 21, 22, 23. The PC-MOP module 1690 is further configured to determine bit and power allocations with which to transmit data signal to provide the increased SNRs of signals along the TMP 21, 22, 23. In particular, the PC-MOP module 1690 may be configured to determine bit and power allocation such that the maximum capacities of the channels (i.e. the maximum transmission bit rates) are substantially achieved.

Apparatus, including the PC-MOP module 1690 and MPAD 1670, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

What follows is a mathematical explanation of the functioning of certain elements of the above described system. This mathematical explanation is useful in the understanding of the embodiments of the methods of increasing the SNR of signals transmitted along the TMPs 21, 22, 23, which embodiments are described in more detail later below with reference to FIGS. 3 to 5.

Considering a system comprising a bundle of k TMPs and/or phantom channels, the full transmission characteristics for a single frequency of the differential mode channel may be represented as:

$$H = \begin{pmatrix} h_{1,1} & h_{1,2} & \Lambda & h_{1,k} \\ h_{2,1} & h_{2,2} & \Lambda & h_{2,k} \\ M & M & O & M \\ h_{k,1} & h_{k,2} & \Lambda & h_{k,k} \end{pmatrix}$$

where $h_{i,j}$ indicates a channel transfer function, a value of which is dependent on crosstalk transmissions from the jth TMP/phantom channel onto the ith TMP/phantom channel. In other words, $h_{i,j}$ is a measure of the electromagnetic coupling of the jth channel to the ith channel. For example, $h_{i,j}$ may be indicative of the extent of coupling between the jth channel and the ith channel. Values of $h_{i,j}$ may be dependent on an attenuation on the amplitude of signals on the ith channel caused by the jth channel. Values of $h_{i,j}$ may be dependent on a delay and/or phase shift on the phase of signals on the ith channel caused by the jth channel.

In this embodiment, the channel transfer matrix H is known i.e. measured. For example, the channel transfer matrix H may be determined using known channel estimation techniques.

Values of $h_{i,j}$ may be measured, for example, using test signals, by the MPAD 1670. Measurement of the $h_{i,j}$ values may comprise, or be regarded as equivalent to, measuring one or more of the following parameters selected from the group of parameters consisting of: a channel response of the ith channel under conditions in which the jth channel (e.g. only the jth channel) is transmitting crosstalk interference onto the ith channel, an impulse response of the ith channel under conditions in which the jth channel (e.g. only the jth channel) is transmitting crosstalk interference onto the ith channel, and a frequency response of the ith channel under conditions in which the jth channel (e.g. only the jth channel) is transmitting crosstalk interference onto the ith channel.

The bundle of k TMPs and/or phantom channels may be contained in a common binder.

For convenience, herein a sub-matrix of H is considered, i.e.

$$H_{sub} = \begin{pmatrix} h_{1,1} & h_{1,2} & h_{1,3} & \ldots & h_{1,8} \\ h_{2,1} & h_{2,2} & h_{2,3} & \ldots & h_{2,8} \\ h_{3,1} & h_{3,2} & h_{3,3} & \ldots & h_{3,8} \end{pmatrix}$$

which represents cross-talk from each of the TMPs 21-28 to each of the first, second, and third TMPs 21, 22, 23. In other embodiments, a different sub-matrix or the full matrix H is considered.

As mentioned above, in operation, the PC-MOP module 1690 performs a crosstalk splitting and steering process to maximise aggregate bundle capacity. To achieve this, the MICOP and MRC precoder module 1640 may generate the further modified complex numbers $\ddot{x}_1^1$ to $\ddot{x}_M^1$, etc. to drive the TMPs 21-28 based on the following factor:

$$P_{MRC} = \begin{pmatrix} \frac{h_{1,1}^*}{|h_{1,1}|} & 0 & 0 & \ldots & \frac{\rho_{1,8} h_{1,8}^*}{|h_{1,8}|} \\ 0 & \frac{h_{2,2}^*}{|h_{2,2}|} & 0 & \ldots & \frac{\rho_{2,8} h_{2,8}^*}{|h_{2,8}|} \\ 0 & 0 & \frac{h_{3,3}^*}{|h_{3,3}|} & \ldots & \frac{\rho_{3,8} h_{3,8}^*}{|h_{3,8}|} \end{pmatrix}$$

where $\rho_{i,j}$ is a pair sharing and steering factor representative of a proportion of the power along the jth TMP that is allocated to supporting transmission along the ith TMP. In this embodiment, the $\rho_{i,j}$ satisfy the following conditions: $0 \leq \rho_{1,j} + \rho_{2,j} + \rho_{3,j} \leq 1$, $\forall j \in \{4, \ldots, 8\}$ and $\rho_{i,j} \in [0,1]$. In some embodiments, $\rho_{i,j}$ are binary allocation factors, i.e. $\rho_{i,j} \in \{0,1\}$.

In this example, there is little to no interaction between the first, second, and third TMPs 21, 22, 23, for example as a result of the above described vectoring process. However, crosstalk interference from the further TMPs 24-28 onto the first, second, and third TMPs 21, 22, 23 may be non-zero.

The maximum capacity of a channel (which may also be referred to as Shannon's capacity limit) is expressed as:

$$C = B \log_2\left(1 + \frac{S}{N}\right) \qquad (1)$$

where: C is the maximum capacity of the channel (in bits/second) for the given channel; B is the bandwidth of the channel (in Hertz); S is the signal power (in Watts); and N is the noise power (in Watts). The ratio S/N is called the Signal to Noise Ratio (SNR).

Thus, the crosstalk splitting and steering process to maximise aggregate bundle capacity that is performed by the PC-MOP module 1690 is that of, for each of the further TMPs 24-28 (and phantom channels in some embodiments), maximising the following objective function:

$$C_j = \sum_{m=1, i=1, j=1}^{m=M, i=3, j=8} \rho_{i,j}^m \log_2\left(1 + \frac{s_{i,j}^m \gamma_{i,j}^m}{\rho_{i,j}^m}\right) \qquad (2)$$

where: i is an index for the target receivers and the associated direct-channel TMPs, i.e. i indexes channels receiving crosstalk interference from channel j. In this embodiment, the first, second, and third channels are to receive crosstalk interference from the further TMPs 24-28. Thus i=1, . . . , 3;

j is an index for TMPs acting as transmitters of crosstalk interference. Thus, j=1, . . . 8;

m is a frequency index for the M different tones, m=1, . . . M;

$\rho_{i,j}^m$ it is a pair sharing factor indicating, for tone m, the proportion of transmit power along the jth TMP that is allocated to crosstalk interfere with the ith TMP;

$s_{i,j}^m$ is a power level of crosstalk interference transmitted from the jth channel onto the ith channel, at the mth tone; and $\gamma_{i,j}^m$ is a channel gain in the ith channel caused by crosstalk interference from the jth channel. In this embodiment, $\gamma_{i,j}^m$ is a ratio of power coupling coefficient to the noise level at the mth tone, i.e.

$$\gamma_{i,j}^m = \left(\frac{|h_{i,j}|^2}{n_{i,i}}\right)_m,$$

where $n_{i,j}$ is a noise level of the ith channel for given tone m. The channel gain $\gamma_{i,j}^m$ can also include other factors, for example one or more factors selected from the group of factors consisting of: coding gain, margin, gap value, and deterministic noise signals.

In this embodiment, the above objective function (equation (2)) is optimised with respect to the following constraints:

$$\Delta_f \sum_{m,i} s_{i,j}^m \leq P_T \qquad (3)$$

$$\sum_i \rho_{i,j}^m \leq 1, \forall m \qquad (4)$$

$$s_{i,j}^m \leq p_m, \forall m \qquad (5)$$

$$b_{min} \leq \rho_{i,j}^m \log_2\left(1 + \frac{s_{i,j}^m \gamma_{i,j}^m}{\rho_{i,j}^m}\right) \leq b_{max} \qquad (6)$$

where: $P_T$ is the maximum transmitting power (also known as the Aggregate Transmit Power (ATP)) permitted for the bundle of k TMPs and/or phantom channels;

$p_m$ is a transmission power mask for tone m. In this embodiment, the power mask is an upper threshold for power for signal transmission at tone m above which power value transmission is not permitted. The transmission power mask(s) may be set, for example, by an official regulatory body;

$b_{min}$ is a lower bound for the channel capacity. In this embodiment, $b_{min}$ is set to zero (0). However, in other embodiments, $b_{min}$ may have a different appropriate value;

$b_{max}$ is an upper bound for the channel capacity. In this embodiment, $b_{max}$ is a bit limit for the TMPs and/or phantom channels.

Values for $b_{min}$ and/or $b_{max}$ may result from hardware limitations.

The above objective function (equation (2)) is a concave objective function that is to be maximised subject to the constraints in equations (3)-(6). Since the objective function (equation (2)) is concave, its optimisation is tractable. The optimisation of the objective function (equation (2)) proceeds with the Lagrangian as follows:

$$\mathcal{L} = \sum_{m,i,j} \rho_{i,j}^m \log_2\left(1 + \frac{s_{i,j}^m \gamma_{i,j}^m}{\rho_{i,j}^m}\right) - \Omega_{i,j}\left(\sum_{m,i} s_{i,j}^m - P_T\right) - \qquad (7)$$

$$\sum_m \mu_{i,j}^m \left(\sum_i \rho_{i,j}^m - 1\right) - \sum_m \eta_{i,j}^m \left(\sum_i s_{i,j}^m - p_m\right) -$$

-continued $$\sum_m \beta_{max_{i,j}}^m \left[\sum_i \rho_{i,j}^m \log_2\left(1 + \frac{s_{i,j}^m \gamma_{i,j}^m}{\rho_{i,j}^m}\right) - b_{max}\right] -$$

$$\sum_m \beta_{min_{i,j}}^m \left[\sum_i \rho_{i,j}^m \log_2\left(1 + \frac{s_{i,j}^m \gamma_{i,j}^m}{\rho_{i,j}^m}\right) - b_{min}\right]$$

where $\Omega_{i,j}$, $\eta_{i,j}^m$, $\mu_{i,j}^m$, $\beta_{max_{i,j}}^m$, and $\beta_{min_{i,j}}^m$ are Lagrangian multipliers.

To solve (7) and to show its optimality, in this embodiment the Karush Kuhn Tucker (KKT) conditions are satisfied. These conditions are as follows:

1. Feasibility of the primal constraints as well as the multipliers, i.e. $\Omega_{i,j}$, $\eta_{i,j}^m$, $\mu_{i,j}^m$, $\beta_{max_{i,j}}^m$, and $\beta_{min_{i,j}}^m \geq 0$.

2. The gradient of the Lagrangian (equation (7)) with respect to s, and the gradient of the Lagrangian (equation (7)) with respect to $\rho$ both become zero.

Differentiating the Lagrangian (equation (7)) with respect to s, i.e. $d\mathcal{L}/ds=0$, and rearranging for s gives the optimal power formula:

$$s_{i,j}^m = \rho_{i,j}^m \left[\frac{\left(1 - \beta_{max_{i,j}}^m - \beta_{min_{i,j}}^m\right)}{(\Omega_{i,j} + \eta_{i,j}^m) \ln 2} - \frac{1}{\gamma_{i,j}^m}\right] \text{(Watt/Hz)} \qquad (8)$$

Differentiating the Lagrangian (equation (7)) with respect to $\rho$, i.e. $d\mathcal{L}/d\rho=0$, and rearranging for $\mu$ gives:

$$\mu_{i,j}^m = \left(1 - \beta_{max_{i,j}}^m - \beta_{min_{i,j}}^m\right) \qquad (9)$$

$$\left\{\log_2\left[\frac{\gamma_{i,j}^m\left(1 - \beta_{max_{i,j}}^m - \beta_{min_{i,j}}^m\right)}{\ln 2(\Omega_{i,j} + \eta_{i,j}^m)}\right] - \left[\frac{1}{\ln 2} - \frac{(\Omega_{i,j} + \eta_{i,j}^m)}{\gamma_{i,j}^m\left(1 - \beta_{max_{i,j}}^m - \beta_{min_{i,j}}^m\right)}\right]\right\}$$

Figure 3:
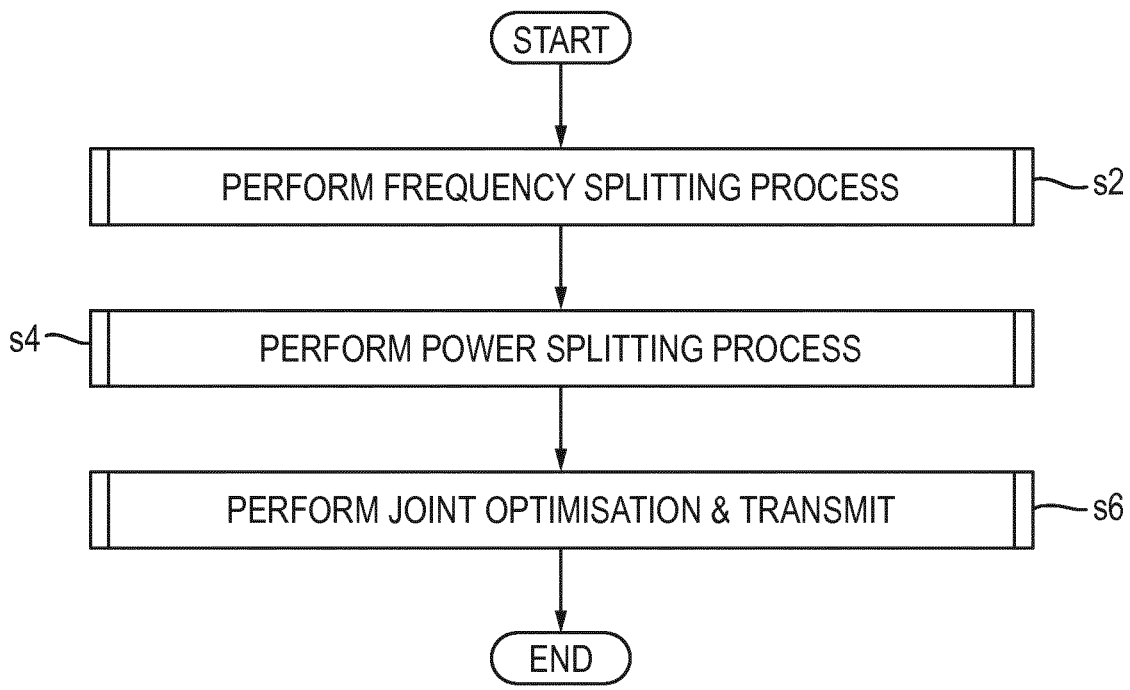
FIG. 3 is a process flow chart showing certain steps of a data transmission method.

What will now be described with reference to FIG. 3 is an embodiment of a data transmission method in which indirect channels (e.g. the further TMPs 24-28 in this embodiment, but also the phantom channels in other embodiments) are operated to improve the SNR of signals along the first, second, and third TMPs 21, 22, 23. Advantageously, the data transmission tends to achieve substantially maximum channel capacity. In this embodiment, this method is performed by the MPAD 1670 and/or the PC-MOP 1690. However, in other embodiments, the method is performed by a different entity instead of or in addition to the MPAD 1670 and/or the PC-MOP 1690.

FIG. 3 is a process flow chart showing certain steps of an embodiment of the data transmission method.

At step s2, the MPAD 1670 and/or the PC-MOP 1690 performs a so-called frequency splitting process. The frequency splitting process is described in more detail later below with reference to FIG. 4. In this embodiment, the frequency splitting process is performed to select, for each of the further TMPs 24-28, and for each tone m, a respective receiver TMP 21-23 that is a preferred (e.g. optimal) receiver of crosstalk interference from that further TMPs 24-28 at that tone m.

At step s4, using the results of the frequency splitting process, the MPAD 1670 performs a so-called power splitting process. The power splitting process is described in more detail later below with reference to FIG. 5. In this embodiment, the power splitting process is performed to determine aggregate power distributions for the direct channel TMPs 21-23.

At step s6, using the results of the frequency splitting process (step s2) and the power splitting process (step s4), the MPAD 1670 performs a joint optimisation process to maximise overall channel capacity. The joint optimisation process performed at step s6 is a bit and power allocation process.

The joint optimisation process is described in more detail later below with reference to FIG. 6. In this embodiment, the process performed at step s6 includes transmitting signals along the TMPs 21-28.

Thus, an embodiment of a data transmission method is provided.

Figure 4:
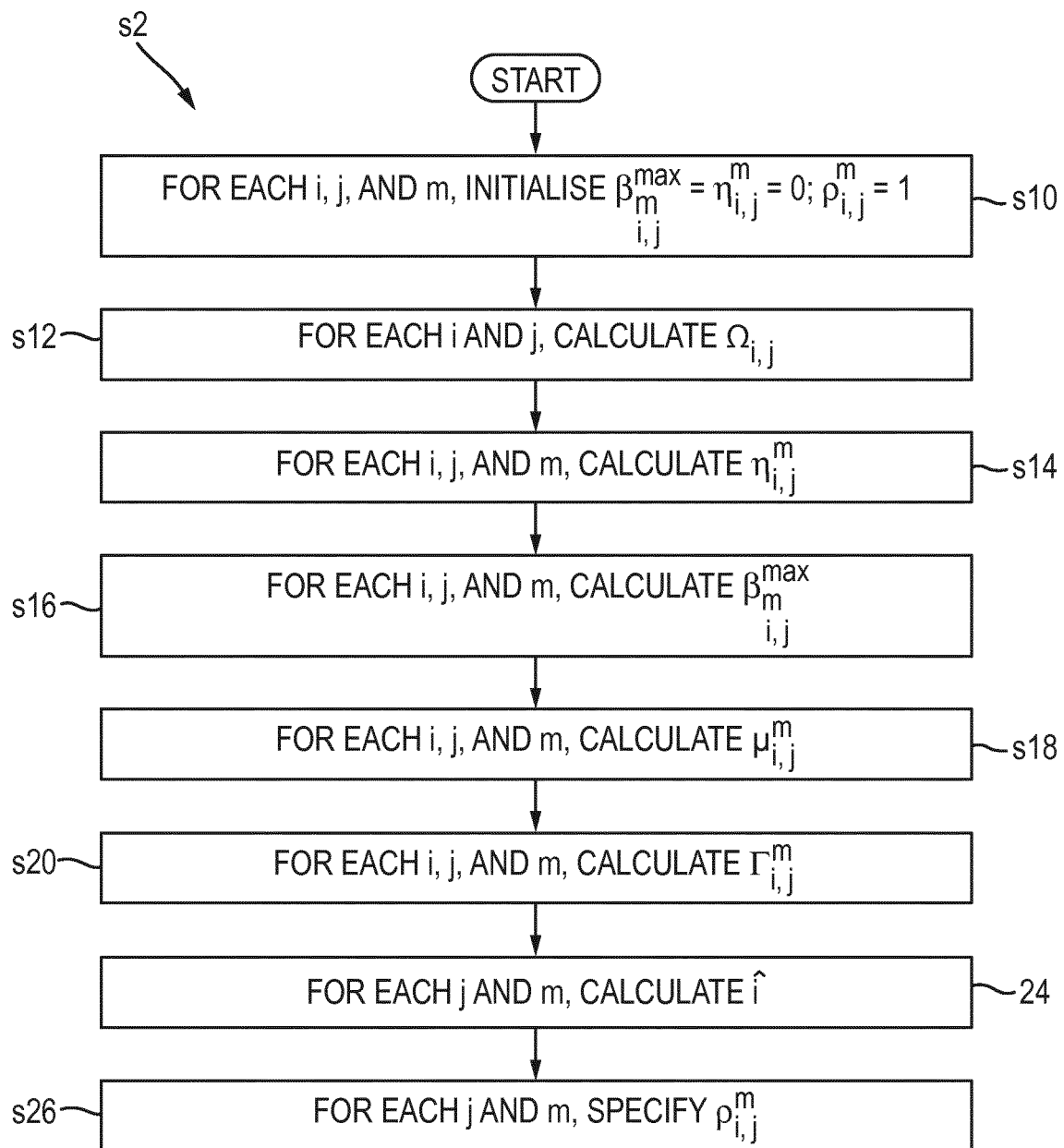
FIG. 4 is a process flow chart showing certain steps of a frequency splitting process of the data transmission method.

Returning now to the description of step s2, FIG. 4 is a process flow chart showing certain steps of the frequency splitting process.

In this embodiment, $b_{min}=0$. Thus, also $$\beta^m_{min_{j,j}} = 0.$$

However, in some embodiments, $b_{min}$ may have a different, non-zero value. Also, in some embodiments, $$\beta^m_{min_{j,j}}$$

may have a different, non-zero value.

At step s10, for each of the direct TMPs 21-23 indexed by i=1, ..., 3, and for each of the indirect TMPs 24-28 indexed by j=4, ..., 8, and for each tone m=1, ..., M, $$\beta^m_{max_{j,j}}$$

and $\eta_{i,j}^m$ are initialised to zero, and $\rho_{i,j}^m$ is initialised to one. That is to say:

$$\beta^m_{max_{i,j}} = \eta^m_{i,j} = 0 \qquad (10)$$

$$\rho^m_{i,j} = 1. \qquad (11)$$

At step s12, for each of the direct TMPs 21-23 indexed by i=1, ..., 3, and for each of the indirect TMPs 24-28 indexed by j=4, ..., 8, a value of $\Omega_{i,j}$ is computed. In this embodiment, $\Omega_{i,j}^m$ is computed by using equations (8) and (3), with the parameters initialised as in step s10. In particular, equation (8) is plugged into equation (3) to give:

$$\Omega_{i,j} = \frac{M}{\ln 2 \left( \frac{P_T}{\Delta_f} + \sum_m \frac{1}{\gamma_{i,j}^m} \right)} \qquad (12)$$

where: M is the number of different tones; and $\Delta_f$ is a frequency spacing between adjacent tones.

At step s14, for each of the direct TMPs 21-23 indexed by i=1, ..., 3, and for each of the indirect TMPs 24-28 indexed by j=4, ..., 8, and for each tone m=1, ..., M, a value for $\eta_{i,j}^m$ is computed. In this embodiment, $\eta_{i,j}^m$ is computed by using equation (8) and the value for $\Omega_{i,j}$ computed at step s12. In particular, equation (8) is set equal to $p_m$ (i.e. the transmission power mask for tone m), and then rearranged for $\eta_{i,j}^m$ to give:

$$\eta^m_{i,j} = \frac{\gamma^m_{i,j}\left(1 - \beta^m_{max_{i,j}}\right)}{(\ln 2)(1 + p_m \gamma^m_{i,j})} - \Omega_{i,j} \qquad (13)$$

At step s16, for each of the direct TMPs 21-23 indexed by i=1, ..., 3, and for each of the indirect TMPs 24-28 indexed by j=4, ..., 8, and for each tone m=1, ..., M, a value for $$\beta^m_{max_{i,j}}$$

is computed. In this embodiment, $$\beta^m_{max_{i,j}}$$

is computed using equation (8) and the equation $\log_2(1+s_{i,j}^m \gamma_{i,j}^m)=b_{max}$. In particular, equation (8) is plugged into $\log_2(1+s_{i,j}^m \gamma_{i,j}^m)=b_{max}$ and rearranged for $$\beta^m_{max_{i,j}}$$

to give:

$$\beta^m_{max_{i,j}} = 1 - \frac{2^{b_{max}}(\ln 2)(\Omega_{i,j} + \eta^m_{i,j})}{\gamma^m_{i,j}} \qquad (14)$$

At step s18, for each of the direct TMPs 21-23 indexed by i=1, ..., 3, and for each of the indirect TMPs 24-28 indexed by j=4, ..., 8, and for each tone m=1, ..., M, a value for $\mu_{i,j}^m$ is computed using equation (9) and the computed and the values for $\Omega_{i,j}$, $\eta_{i,j}^m$, and $$\beta_{max\ i,j}^m$$

computed at steps s12, s14, and s16 respectively.

At step s20, for each of the direct TMPs 21-23 indexed by i=1, ..., 3, and for each of the indirect TMPs 24-28 indexed by j=4, ..., 8, and for each tone m=1, ..., M, a value of $\Gamma_{i,j}^m$ is computed. In this embodiment, $\Gamma_{i,j}^m$ is given by:

$$\Gamma_{i,j}^m = \frac{\gamma_{i,j}^m}{\gamma_{i,i}^m} \qquad (15)$$

where: $\gamma_{i,j}^m$ is a channel gain in the ith channel caused by the jth channel; and $\gamma_{i,i}^m$ is a channel gain along the ith channel.

In this embodiment, the gains $\gamma_{i,i}^m$ and $\gamma_{i,j}^m$ are determined or measured by the MPAD 1670 (for example, from measured values of $h_{ij}$) or by state of the art channel estimation in DSL devices, e.g. vectoring control entity (VCE) channel feedback in G.fast.

At step s24, for each of the indirect TMPs 24-28 indexed by j=4, ..., 8, and for each tone m=1, ..., M, a value of the function $\hat{i}$ is determined, where:

$$\hat{i} = \arg\max_i \{\mu_{i,j}^m \wedge \Gamma_{i,j}^m\} \qquad (16)$$

where the wedge symbol ($\wedge$) denotes the logical conjunction (AND) operator.

In this embodiment, $\hat{i}$ is the index identifier of the direct channel TMP connection 21-23, that most strongly receives crosstalk interference from the jth further TMP connection 24-28, at the mth tone. In other words, $\hat{i}$ is an identifier of the channel acting as a receiver of crosstalk which is most strongly affected by, or crosstalk coupled to, signals transmitted on the jth channel at the mth tone.

At step s26, for each of the indirect TMPs 24-28 indexed by j=4, ..., 8, and for each tone m=1, ..., M, a values of the allocation factor ρ for the direct-channel TMP identified by $\hat{i}$ is set equal to one, while the allocation factors of the other direct-channel TMPs 21-23 are set equal to zero, i.e.:

$$\rho_{\hat{i},j}^m = 1 \qquad (17)$$

$$\rho_{i,j}^m = 0, \forall i \neq \hat{i} \qquad (18)$$

Thus, the frequency splitting process is provided. In this embodiment, for each of the further TMPs 24-28 and for each tone m, a direct-channel TMP 21-23 that is the best receiver of crosstalk interference from that further TMP 24-28 at that tone m is determined and allocated to that further TMP 24-28 and that tone m.

Returning now to the description of step s4, in this embodiment, the power splitting process is performed to optimise power distribution in accordance with the allocation determined at step s2 and described in more detail above with reference to FIG. 3. In this embodiment, the power splitting process is performed to maximise the following objective function:

$$C_j = \Delta_f \sum_{m=1,\hat{i}}^{m=M} \rho_{i,j}^m \log_2\left(1 + \frac{s_{i,j}^m \gamma_{i,j}^m}{\rho_{i,j}^m}\right) \qquad (19)$$

where: j is an index for the indirect-channel TMPs 24-28, j=4, ... 8;

m is a frequency index for the M different tones, m=1, ... M;

$\hat{i}$ is the direct TMP selected for the jth indirect TMP and mth tone, at step s2.

In this embodiment, the above objective function (equation (19)) is optimised with respect to the following constraints:

$$\Delta_f \sum_{m,\hat{i}} s_{i,j}^m \leq P_T \qquad (20)$$

$$\sum_{\hat{i}} \rho_{i,j}^m \leq 1, \forall m \qquad (21)$$

$$s_{i,j}^m \leq p_m, \forall m \qquad (22)$$

$$b_{min} \leq \rho_{i,j}^m \log_2\left(1 + \frac{s_{i,j}^m \gamma_{i,j}^m}{\rho_{i,j}^m}\right) \leq b_{max} \qquad (23)$$

Optionally, in some embodiments, the right-hand side of Equation 21 can be set equal to the number of the active receivers when vectoring is employed, as opposed to 1.

Figure 5:
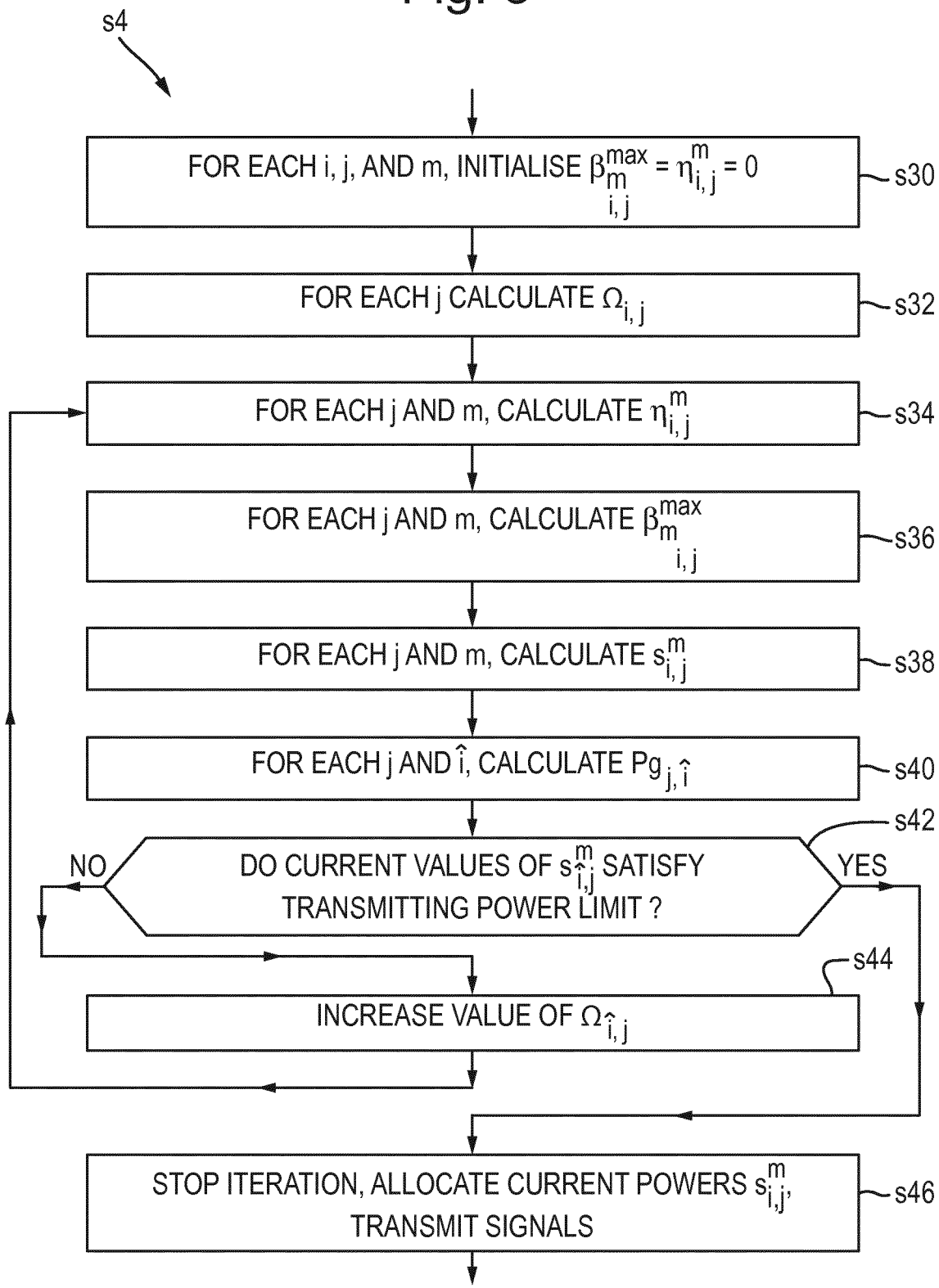
FIG. 5 is a process flow chart showing certain steps of a power splitting process of the data transmission method.

FIG. 5 is a process flow chart showing certain steps of the power splitting process.

In this embodiment, $b_{min}=0$. Thus, also $$\beta_{min\ j,j}^m = 0.$$

However, in some embodiments, $b_{min}$ may have a different, non-zero value. Also, in some embodiments, $$\beta_{min\ j,j}^m$$

may have a different, non-zero value.

At step s30, for each of the direct TMPs 21-23 indexed by i=1, ..., 3, and for each of the indirect TMPs 24-28 indexed by j=4, ..., 8, and for each tone m=1, ..., M, $$\beta_{max\ j,j}^m$$

and $\eta_{i,j}^m$ are initialised to zero. That is to say:

$$\beta_{max\ i,j}^m = \eta_{i,j}^m = 0$$

Also, in this embodiment, the allocation factors ρ are set as determined at step s26.

At step s32, for each of the indirect TMPs 24-28 indexed by j=4, . . . , 8, a value of $\Omega_{\hat{i},j}$ is computed, where $\hat{i}$ is the direct TMP selected for that jth indirect TMP at step s2. In this embodiment, $\Omega_{\hat{i},j}$ is determined as described earlier above at step s12, with i replaced by $\hat{i}$, i.e.:

$$\Omega_{i,j} = \frac{M}{\ln 2\left(\frac{P_T}{\Delta_f} + \sum_m \frac{1}{\gamma_{i,j}^m}\right)} \quad (24)$$

At step s34, for each of the indirect TMPs 24-28 indexed by j=4, . . . , 8, and for each tone m=1, . . . , M, a value for $\eta_{\hat{i},j}^m$ is computed, where $\hat{i}$ is the direct TMP selected for that jth indirect TMP and that tone m at step s2. In this embodiment, $\eta_{\hat{i},j}^m$ is computed by using equation (8) and the value for $\Omega_{\hat{i},j}$ computed at step s32. In particular, equation (8) is set equal to $p_m$ (i.e. the transmission power mask for tone m), and then rearranged for $\eta_{\hat{i},j}^m$ to give:

$$\eta_{i,j}^m = \frac{\gamma_{i,j}^m\left(1 - \beta_{\max_{i,j}}^m\right)}{(\ln 2)(1 + p_m \gamma_{i,j}^m)} - \Omega_{i,j} \quad (25)$$

At step s36, for each of the indirect TMPs 24-28 indexed by j=4, . . . , 8, and for each tone m=1, . . . , M, a value for $$\beta_{\max_{i,j}}^m$$

is computed, where $\hat{i}$ is the direct TMP selected for that jth indirect TMP and that tone m at step s2. In this embodiment, $$\beta_{\max_{i,j}}^m$$

is computed using equation (8) and the equation $\log_2(1+s_{i,j}^m \gamma_{i,j}^m)=b_{max}$. In particular, equation (8) is plugged into $\log_2(1+s_{i,j}^m \gamma_{i,j}^m)=b_{max}$ and rearranged for $$\beta_{\max_{i,j}}^m$$

to give:

$$\beta_{\max_{i,j}}^m = 1 - \frac{2^{b_{max}} (\ln 2)(\Omega_{i,j} + \eta_{i,j}^m)}{\gamma_{i,j}^m} \quad (26)$$

At step s38, for each of the indirect TMPs 24-28 indexed by j=4, . . . , 8, and for each tone m=1, . . . , M, a value for $s_{\hat{i},j}^m$ is computed, where $\hat{i}$ is the direct TMP selected for that jth indirect TMP and that tone m at step s2. The values for $s_{\hat{i},j}^m$ are computed by using equation (8) and the values for $\Omega_{\hat{i},j}$, $\eta_{\hat{i},j}^m$ and $$\beta_{\max_{\hat{i},j}}^m$$

computed at steps s32, s34, s36 respectively. In other words, values of $s_{\hat{i},j}^m$ are determined, where:

$$s_{i,j}^m = \rho_{i,j}^m \left[\frac{\left(1 - \beta_{\max_{i,j}}^m - \beta_{\min_{i,j}}^m\right)}{(\Omega_{i,j} + \eta_{i,j}^m) \ln 2} - \frac{1}{\gamma_{i,j}^m}\right]$$

Optionally, at step s40, for each of the indirect TMPs 24-28 indexed by j=4, . . . , 8, and for each of the direct TMPs 21-23 selected as receivers of crosstalk interference from that indirect TMP j (which are indexed by $\hat{i}$), a value of the aggregate power distribution $Pg_{\hat{i},j}$ between that indirect TMP j and that direct TMP $\hat{i}$ is determined, where $$Pg_{i,j} = \Delta_f \sum_m s_{i,j}^m, \; \forall \; \hat{i} \quad (27)$$

Thus, the power splitting process is provided. In this embodiment, for each of the further TMPs 24-28 and for each tone m, a power allocation for the direct-channel TMP 21-23 that is the best receiver of crosstalk interference from that further TMP 24-28 at that tone m is determined, and is allocated to that further TMP 24-28 and that tone m.

At step s42, it is determined whether or not the determined power allocations are less than or equal to the maximum permitted transmitting power for the bundle of TMPs 21-28. In particular, it is determined whether or not the following equation is satisfied:

$$\Delta_f \sum_{m=1}^M s_{i,j}^m \le P_T \quad (27a)$$

In embodiments in which values for $Pg_{\hat{i},j}$ were calculated at step s40, the calculated values for $Pg_{\hat{i},j}$ may be used to check whether or not the determined power allocations are less than the maximum permitted transmitting power instead of or in addition to Equation 27a.

In this embodiment, if, at step s42, Equation 27a is satisfied (i.e. it is determined that the determined power allocations are less than or equal to the maximum permitted transmitting power for the bundle of TMPs 21-28), the process of FIG. 5 proceeds to step s46.

However, if, at step s42, Equation 27a is not satisfied (i.e. it is determined that the determined power allocations are less than the maximum permitted transmitting power for the bundle of TMPs 21-28), the process of FIG. 5 proceeds to step s44.

At step s44, the value of $\Omega_{\hat{i},j}$ is increased (e.g. by a predetermined amount) and the process of FIG. 5 returns to step s34.

At step s46, the AN 16 transmits signals in accordance with the determined allocated power values $s_{\hat{i},j}^m$. For example, for each tone m, the AN 16 may transmit a signal having transmission power $s_{\hat{i},j}^m$ at tone m along the jth TMP.

Thus, the power splitting process is provided.

In the process of step s4 above, the bit loading limits at s4 may be chosen for convenience. In some embodiments, optionally the bit loading limits in s4 can be further optimised (e.g. using a heuristic process) to improve further the efficiency of the power contribution. Final bit loading may be decided in step s6, which will now be described.

Returning now to the description of step s6, in this embodiment, to perform the joint optimisation process to allocate bits and power to the channels and tones, any appropriate so-called "water filling" algorithm may be used. A known water filling algorithm may be adapted to account for the results of the above described frequency splitting process, i.e. the steered cross talk expressed by the allocation factors ρ. Also, the water filling algorithm may be adapted to account for the results of the above described power splitting process, i.e. the power distributions expressed by the determined values for $s_{i,j}^m$ and/or $Pg_{i,j}$.

In this embodiment, the process of step s6 is performed to maximise the following objective function:

$$C_{\hat{i}} = \sum_{m=1}^{m=M} \rho_{\hat{i},\hat{i}}^m \log_2\left(1 + \frac{s_{\hat{i},\hat{i}}^m \gamma_{\hat{i},\hat{i}}^m}{\rho_{\hat{i},\hat{i}}^m} + \sum_{j \neq \hat{i}} c_{\hat{i},j}^m\right)$$

where:

$$\sum_{j \neq \hat{i}} c_{\hat{i},j}^m$$

is the signal power that the $\hat{i}$ direct TMP receives from all of the other TMPs (i.e. the TMPs that are not $\hat{i}$).

In this embodiment, the above objective function (equation (28)) is optimised with respect to the following constraints:

$$\Delta_f \sum_m s_{\hat{i},\hat{i}}^m \leq P_T \quad (29)$$

$$\sum_{\hat{i}} \rho_{\hat{i},\hat{i}}^m \leq 1, \forall m \quad (30)$$

$$s_{\hat{i},\hat{i}}^m \leq p_m, \forall m \quad (31)$$

$$b_{min} \leq \rho_{\hat{i},\hat{i}}^m \log_2\left(1 + \frac{s_{\hat{i},\hat{i}}^m \gamma_{\hat{i},\hat{i}}^m}{\rho_{\hat{i},\hat{i}}^m} + \sum_{j \neq \hat{i}} c_{\hat{i},j}^m\right) \leq b_{max} \quad (32)$$

Optionally, in some embodiments, the right-hand side of Equation 30 can be set equal to the number of the active receivers when vectoring is employed, as opposed to 1.

The optimisation problem defined by equations (29) to (32) gives the following power formula:

$$s_{\hat{i},\hat{i}}^m = \rho_{\hat{i},\hat{i}}^m \left[\frac{\left(1 - \beta_{max_{\hat{i},\hat{i}}}^m - \beta_{min_{\hat{i},\hat{i}}}^m\right)}{(\Omega_{\hat{i},\hat{i}} + \eta_{\hat{i},\hat{i}}^m) \ln 2} - \frac{1 + \sum_{j \neq \hat{i}} c_{\hat{i},j}^m}{\gamma_{\hat{i},\hat{i}}^m}\right] \text{(Watt/Hz)} \quad (33)$$

and also:

$$\mu_{\hat{i},\hat{i}}^m = \left(1 - \beta_{max_{\hat{i},\hat{i}}}^m - \beta_{min_{\hat{i},\hat{i}}}^m\right) \quad (34)$$

$$\left\{\log_2\left[\frac{\gamma_{\hat{i},\hat{i}}^m\left(1 - \beta_{max_{\hat{i},\hat{i}}}^m - \beta_{min_{\hat{i},\hat{i}}}^m\right)}{\ln 2(\Omega_{\hat{i},\hat{i}} + \eta_{\hat{i},\hat{i}}^m)}\right] - \left[\frac{1}{\ln 2} - \frac{(\Omega_{\hat{i},\hat{i}} + \eta_{\hat{i},\hat{i}}^m)\left(1 + \sum_{j \neq \hat{i}} c_{\hat{i},j}^m\right)}{\gamma_{\hat{i},\hat{i}}^m\left(1 - \beta_{max_{\hat{i},\hat{i}}}^m - \beta_{min_{\hat{i},\hat{i}}}^m\right)}\right]\right\}$$

Figure 6:
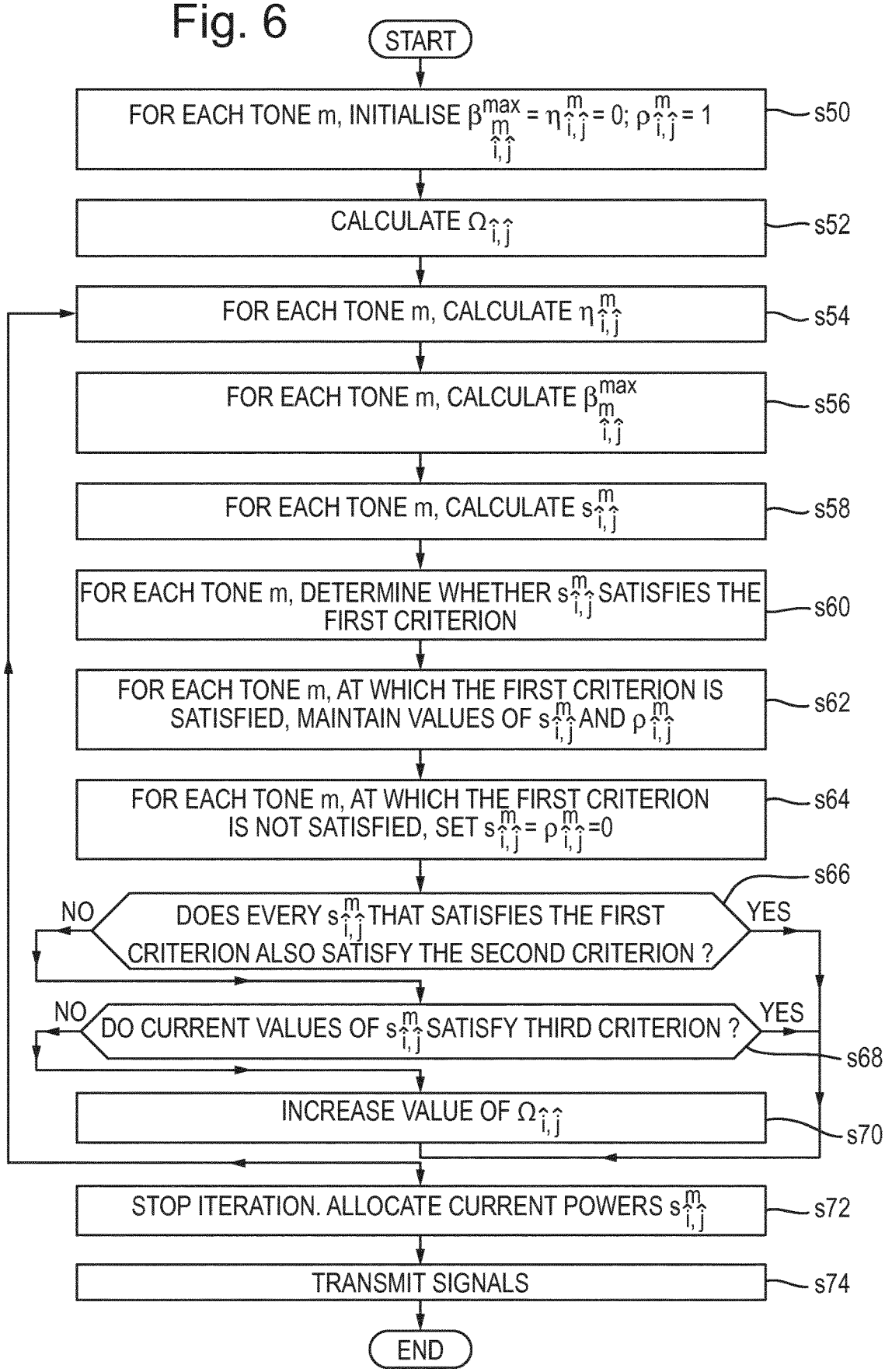
FIG. 6 is a process flow chart showing certain steps of a joint optimisation process of the data transmission method.

FIG. 6 is a process flow chart showing certain steps of an example joint optimisation process that may be performed at step s6.

At step s50, for each tone m, $$\beta_{max_{\hat{i},\hat{i}}}^m$$

and $\eta_{\hat{i},\hat{i}}^m$ are initialised to zero, and $\rho_{\hat{i},\hat{i}}^m$ is initialised to one.

At step s52, for the $\hat{i}$ channel, a value of $\Omega_{\hat{i},\hat{i}}$ is computed. In this embodiment, $\Omega_{\hat{i},\hat{i}}$ is computed by using equations (33) and (29), with the parameters initialised as in step s50, which give:

$$\Omega_{\hat{i},\hat{i}} = \frac{M}{\ln 2\left(\frac{P_T}{\Delta_f} + \sum_m \frac{\left(1 + \sum_{j \neq \hat{i}} c_{\hat{i},j}^m\right)}{\gamma_{\hat{i},\hat{i}}^m}\right)} \quad (35)$$

In this embodiment, the value of $\Omega_{\hat{i},\hat{i}}$ is computed using a measured value of $h_{\hat{i},\hat{i}}$.

At step s54, for each tone m, a value for $\eta_{\hat{i},\hat{i}}^m$ is computed. In this embodiment, $\eta_m$ is computed by using equation (33) and the value for $\Omega_{\hat{i},\hat{i}}$ computed at step s52. In particular, equation (33) is set equal to $p_m$ (i.e. the transmission power mask for tone m), and then rearranged for $\eta_{\hat{i},\hat{i}}^m$.

At step s56, for each tone m, a value for $$\beta_{max_{j,j}}^m$$

is computed. In this embodiment, $$\beta_{max_{j,j}}^m$$

is computed by plugging equation (33) into the equation $\log_2(1 + s_{i,j}^m \gamma_{i,j}^m) = b_{max}$.

At step s58, for each tone m, a value for $s_{\hat{i},\hat{i}}^m$ is computed using equation (33) and the computed values for $\Omega_{\hat{i},\hat{i}}$, $\eta_{\hat{i},\hat{i}}^m$ and $$\beta_{max_{j,j}}^m$$

computed at steps s52, s54, and s56 respectively.

At step s60, for each tone m, it is determined whether or not the calculated value of $s_{\hat{i},\hat{i}}^m$ for that tone m satisfies a first criterion. In this embodiment, the first criterion is:

$$\log_2(1+s_{\hat{i},\hat{i}}^m \cdot \gamma_{\hat{i},\hat{i}}^m) > 0 \qquad (36)$$

At step s62, for each tone m for which $s_{\hat{i},\hat{i}}^m$ satisfies the first criterion, the values for $s_{\hat{i},\hat{i}}^m$ and $\rho_{\hat{i},\hat{i}}^m$ of that tone are maintained.

At step s64, for each tone m for which $s_{\hat{i},\hat{i}}^m$ fails to satisfy the first criterion, the values for $s_{\hat{i},\hat{i}}^m$ and $\rho_{\hat{i},\hat{i}}^m$ of that tone are set equal to zero.

At step s66, for each tone m for which $s_{\hat{i},\hat{i}}^m$ satisfies the first criterion, it is determined whether or not $s_{\hat{i},\hat{i}}^m$ satisfies a second criterion. In this embodiment, the second criterion is:

$$\log_2(1+s_{\hat{i},\hat{i}}^m \gamma_{\hat{i},\hat{i}}^m) \le b_{max} \qquad (37)$$

If, at step s66, it is determined that all of the $s_{\hat{i},\hat{i}}^m$ values which satisfy the first criterion (equation (36)) also satisfy the second criterion (equation (37)), then the method proceeds to step s72. Step s72 will be described in more detail later below, after a description of method steps s68 to s70.

However, if, at step s66, it is determined that not all of the $s_{\hat{i},\hat{i}}^m$ values which satisfy the first criterion (equation (36)) also satisfy the second criterion (equation (37)), then the method proceeds to step s68.

At step s68, it is determined whether or not the current values of $s_{\hat{i},\hat{i}}^m$ satisfy a third criterion. In this embodiment, the third criterion is:

$$\Delta_f \sum_{m=1}^M s_{\hat{i},\hat{i}}^m \le P_T \qquad (38)$$

If, at step s68, it is determined that the third criterion (equation (38)) is satisfied, then the method proceeds to step s72. Step s72 will be described in more detail later below, after a description of method step s70.

However, if at step s68, it is determined that the third criterion (equation (38)) is not satisfied, then the method proceeds to step s70.

At step s70, for each tone m, the value of $\Omega_{\hat{i},\hat{i}}$ is increased. In some embodiments, for one or more of the tones m, $\Omega_{\hat{i},\hat{i}}$ is increased by $f(\Omega_{\hat{i},\hat{i}})$. By way of example, $f(\Omega_{\hat{i},\hat{i}})$ may be equal to about $\Omega_{\hat{i},\hat{i}}/20$, $\Omega_{\hat{i},\hat{i}}/10$, or $\Omega_{\hat{i},\hat{i}}/5$. In some embodiments, $\Omega_{\hat{i},\hat{i}}$ is increased by a predetermined value. In some embodiments, for each tone m, the value of $\Omega_{\hat{i},\hat{i}}$ is decreased instead of being increased.

After step s70, the method proceeds back to step s54, at which point the values for $\eta_{\hat{i},\hat{i}}^m$ are updated, in turn leading to revised/updated values for $s_{\hat{i},\hat{i}}^m$ and $\rho_{\hat{i},\hat{i}}^m$. Thus, the process of FIG. 3 is an iterative process.

Returning now the case where either 1) it is determined at step s66 that every tone m which did satisfy the first criterion (equation (36)) also satisfies the second criterion (equation (37)); or 2) it is determined at step s18 that the third criterion (equation (38)) is satisfied, the method proceeds to step s72.

At step s72, the iterative process of steps s54 to s70 is stopped. Also, for each $\hat{i}$ direct-channel TMP, each tone m (m=1, ..., M) is allocated its respective current power value $s_{\hat{i},\hat{i}}^m$. It is worth noting that some tones may be not allocated any power, i.e. due to $s_{\hat{i},\hat{i}}^m$ and $\rho_{\hat{i},\hat{i}}^m$ for those tones having been set to zero.

At step s74, the AN 16 transmits signals in accordance with power values allocated at step s72. For example, for each tone m, the AN 16 may transmit a signal having transmission power $s_{\hat{i},\hat{i}}^m$ at tone m along $\hat{i}$ direct-channel TMP.

Thus, an example joint optimisation process that may be performed at step s6 is provided.

In the above described method, active receiver channels (TMPs 21-23) and spare channels (TMPs 24-28) are identified. The spare channels (TMPs 24-28) are "split" and controlled to provide a power contribution (e.g. a maximum power contribution) to the active receiver channels (TMPs 21-23). The direct lines of the active receivers (TMPs 21-23) are then optimised in light of the presence of power contributions from the spare channels (TMPs 24-28).

Advantageously, the above described method and apparatus tends to improve allocation of supporting signals on "unused" lines in respect of deciding which tones to use to support which lines/receivers.

Advantageously, the above described method and apparatus tends to ensure that multiple paths between the AN 16 and the CPE modems 51, 52, 53 are jointly optimised. Thus, the overall channel capacity tends to be optimised.

A further advantage provided by the above described method and apparatus is that convergence to an optimal solution tends to be faster compared to conventional processes.

The solutions provided by the above described algorithms tend to shape the transmitted signals according to the channel response to improve data transmission, e.g. to maximise the delivered data. Also, the above described methods and apparatus tend to take into account the maximum available power and the hardware limitations in transceiver design.

The above described methods and apparatus advantageously tend to provide improved use of power budget, and also match the power budget to channel behaviour.

Advantageously, it tends to be possible to implement the above described methods and apparatus for G.fast and XG.fast at all frequencies.

Advantageously, any complex functionality for implementing certain preferred embodiments of the invention can reside solely in the access network (e.g. at an AN or DSLAM, etc.) rather than requiring any special Customer Premises Equipment (CPE), in certain preferred embodiments of the invention.

It should be noted that certain of the process steps depicted in the flowcharts of FIGS. 3 to 6 and described above may be omitted or such process steps may be performed in differing order to that presented above and shown in FIGS. 3 to 6. Furthermore, although all the process steps have, for convenience and ease of understanding, been depicted as discrete temporally-sequential steps, nevertheless some of the process steps may in fact be performed simultaneously or at least overlapping to some extent temporally.

It should be noted that the described embodiments are couched in terms of the downstream direction of data only (i.e. from an Access Node/DSLAM to Customer Premises Equipment (CPE) devices). However, in a practical implementation the "transmitter" of the above embodiments (e.g. the Access Node) also, naturally, functions as a receiver for upstream transmissions from the various CPE devices (which are also therefore in practice operating as transceivers rather than just receivers). Embodiments of the invention may operate in an entirely conventional manner in the upstream direction.

In the above embodiments, the DPU is connected to three user premises via respective direct TMP connections which connect between the AN within the DPU and respective CPE modems within the respective user premises. However, in other embodiments, the DPU is connected to a different number of user premises (e.g. more than three) via respective one or more direct TMP connections. In some embodiments, the DPU is connected to a different number of CPE modems via respective one or more direct TMP connections. In some embodiments, one or more user premises comprises multiple CPE modems.

In the above embodiments, there are five indirect TMP connections between the DPU and the user premises. However, in other embodiments, there is a different number of indirect TMP connections, for example, more than five.

In the above embodiments, the first criterion is:

$$\log_2(1+s_{j,j}{}^m\gamma_{j,j}{}^m)>0.$$

However, in other embodiments, the first criterion is a different criterion, or is an equivalent criterion expressed in a different way. By way of example, an alternative first criterion is:

$$\log_2(1+s_{j,j}{}^m\gamma_{j,j}{}^m)>\varepsilon_1$$

where $\varepsilon_1$ may be non zero. For example $\varepsilon_1$ may be a positive value, e.g. a small value such as less than or equal to $10^{-2}$, less than or equal to $10^{-3}$, or less than or equal to $10^{-4}$. In some embodiments, $\varepsilon_1$ is a constant value. In some embodiments, $\varepsilon_1$ is a variable that may be dependent on one or more parameters of the broadband deployment.

In the above embodiments, the second criterion is:

$$\log_2(1+s_{j,j}{}^m\gamma_{j,j}{}^m)\leq b_{max}$$

However, in other embodiments, the second criterion is a different criterion, or is an equivalent criterion expressed in a different way. By way of example, an alternative second criterion is:

$$\log_2(1+s_{j,j}{}^m\gamma_{j,j}{}^m)\leq b_{max}-\varepsilon_2$$

where $\varepsilon_2$ may be non zero. For example $\varepsilon_2$ may be a positive value, e.g. a small value such as less than or equal to $10^{-2}$, less than or equal to $10^{-3}$, or less than or equal to $10^{-4}$. In some embodiments, $\varepsilon_2$ is a constant value. In some embodiments, $\varepsilon_2$ is a variable that may be dependent on one or more parameters of the broadband deployment.

In the above embodiments, the third criterion is:

$$\Delta_f \sum_{m=1}^{M} s_{j,j}^m \leq P_T$$

However, in other embodiments, the third criterion is a different criterion, or is an equivalent criterion expressed in a different way. By way of example, an alternative third criterion is:

$$\Delta_f \sum_{m=1}^{M} s_{j,j}^m \leq P_T - \varepsilon_3$$

where $\varepsilon_3$ may be non zero. For example $\varepsilon_3$ may be a positive value, e.g. a small value such as less than or equal to $10^{-2}$, less than or equal to $10^{-3}$, or less than or equal to $10^{-4}$. In some embodiments, $\varepsilon_3$ is a constant value. In some embodiments, $\varepsilon_3$ is a variable that may be dependent on one or more parameters of the broadband deployment.

The invention claimed is:

1. A method of transmitting data from a transmitter device to one or more receiver devices, each of the one or more receiver devices being connected to the transmitter device via a respective wire connection, the transmitter device being operable to transmit signals onto the wire connections at one or more different tones, the transmitter device further being operable to transmit signals onto a further wire connection at the one or more different tones, the method comprising:
   for each of the one or more tones, allocating signals transmitted on the further wire connection at that tone as supporting signals for a particular wire connection;
   for each of the one or more tones, measuring an electromagnetic coupling between the further wire connection and the particular wire connection to which signals transmitted on the further wire connection at that tone have been allocated as supporting signals;
   for each of the one or more tones, using the electromagnetic coupling measurements, determining a power allocation for transmitting a supporting signal on the further wire connection at that tone; and,
   for one or more of the tones:
      transmitting a signal onto the particular wire connection that has been allocated a supporting signal at that tone; and
      transmitting a supporting signal onto the further wire connection at that tone, thereby to cause crosstalk interference in the particular wire connection transmitting the first signal, wherein a transmission power of the supporting signal is based on the power allocation determined for that supporting signal on the further wire connection at that tone.

2. A method according to claim 1, wherein transmitting a signal onto a wire connection comprises:
   determining a power for transmitting the signal on that wire connection comprising optimising a power for transmitting the signal on that wire connection based on power contributions from the supporting signals; and
   transmitting the signal on that wire connection at the determined power.

3. A method according to claim 1, wherein measuring the electromagnetic coupling between the further wire connection and that wire connection comprises measuring a value of a channel transfer function between the further wire connection and that wire connection.

4. A method according to claim 1, wherein the further wire connection is not connected between the transmitter device and the one or more receiver devices.

5. A method according to claim 1, wherein determining the power allocation comprises determining, for each of the one or more tones indexed by m, and for the further wire connection indexed by j, a value of:

$$s_{i,j}^m = \rho_{i,j}^m \left[ \frac{\left(1 - \beta_{max_{i,j}}^m - \beta_{min_{i,j}}^m\right)}{(\Omega_{i,j} + \eta_{i,j}^m) \ln 2} - \frac{1}{\gamma_{i,j}^m} \right]$$

where: m is an index for the different tones;
   j is an index for the further wire connection;
   i denotes the wire connection that has been allocated signals transmitted on the further wire connection at tone m as supporting signals;

$s_{\hat{i},j}^m$ is a power allocation for transmitting a supporting signal for the $\hat{i}$ wire connection on the further wire connection j at tone m;

$\rho_{\hat{i},j}^m$, $\Omega_{\hat{i},j}$, $\eta_{\hat{i},j}^m$, $\beta_{\substack{max \\ \hat{i},j}}^m$, and $\beta_{\substack{min \\ \hat{i},j}}^m$ are variables; and $\gamma_{\hat{i},j}^m$ is a channel gain in the wire connection $\hat{i}$ caused by the further wire connection indexed by j at tone m.

6. A method according to claim 5, wherein:

$$\Omega_{i,j} = \frac{M}{\ln 2 \left( \frac{P_T}{\Delta_f} + \sum_m \frac{1}{\gamma_{i,j}^m} \right)}$$

where: M is the number of different tones;

$\Delta_f$ is a frequency spacing between adjacent tones; and $P_T$ is the maximum power for transmitting the data.

7. The method according to claim 5, wherein:

$$\eta_{i,j}^m = \frac{\gamma_{i,j}^m \left(1 - \beta_{\substack{max \\ i,j}}^m\right)}{(\ln 2)\left(1 + p_m \gamma_{i,j}^m\right)} - \Omega_{i,j}$$

where $p_m$ is a power mask at tone m.

8. The method according to claim 5, wherein:

$$\beta_{\substack{max \\ i,j}}^m = 1 - \frac{2^{b_{max}} (\ln 2)(\Omega_{i,j} + \eta_{i,j}^m)}{\gamma_{i,j}^m}$$

where $b_{max}$ is an upper bound for a channel capacity of the wire connections.

9. A method according to claim 1, wherein the step of allocating signals transmitted on the further wire connection at that tone as supporting signals for a particular wire connection comprises:

for each of the one or more tones, measuring, for each of the wire connections, an electromagnetic coupling between the further wire connection and that wire connection for that tone;

for each of the one or more tones, using the electromagnetic coupling measurements, identifying a wire connection that most strongly receives crosstalk interference from the further wire connection at that tone; and based on the identifications, for each of the one or more tones, allocating signals transmitted on the further wire connection at that tone as supporting signals for a particular wire connection.

10. A method according to claim 9, wherein the step of allocating further comprises determining, for each tone indexed by m, for each wire connection indexed by i, and for the further wire connection indexed by j, a value of:

$$\mu_{i,j}^m = \left(1 - \beta_{\substack{max \\ i,j}}^m - \beta_{\substack{min \\ i,j}}^m\right) \left\{ \log_2 \left[ \frac{\gamma_{i,j}^m \left(1 - \beta_{\substack{max \\ i,j}}^m - \beta_{\substack{min \\ i,j}}^m\right)}{\ln 2(\Omega_{i,j} + \eta_{i,j}^m)} \right] - \left[ \frac{1}{\ln 2} - \frac{(\Omega_{i,j} + \eta_{i,j}^m)}{\gamma_{i,j}^m \left(1 - \beta_{\substack{max \\ i,j}}^m - \beta_{\substack{min \\ i,j}}^m\right)} \right] \right\}$$

where: $\gamma_{i,j}^m$ is a channel gain in the ith wire connection caused by the further wire connection indexed by j; and $\Omega_{i,j}$, $\eta_{i,j}^m$, $\beta_{\substack{max \\ i,j}}^m$, and $\beta_{\substack{min \\ i,j}}^m$ are variables; and the step of identifying comprises using the determined values of $\mu_{i,j}^m$.

11. A method according to claim 9, wherein:

the step of allocating further comprises determining, for each tone indexed by m, for each wire connection indexed by i, and for the further wire connection indexed by j, a value of:

$$\Gamma_{i,j}^m = \frac{\gamma_{i,j}^m}{\gamma_{i,i}^m}$$

where: $\gamma_{i,j}^m$ is a channel gain in the ith wire connection caused by the further wire connection indexed by j at tone m; and $\gamma_{i,i}^m$ is a channel gain along the ith channel at tone m;

the step of identifying comprises using the determined values of $\Gamma_{i,j}^m$; and the step of identifying comprises, for each of the one or more tones and for the further wire connection indexed by j, determining a value of:

$$\hat{i} = \arg \max_i \{\mu_{i,j}^m \wedge \Gamma_{i,j}^m\}$$

wherein $\hat{i}$ denotes the identified wire connection that most strongly receives crosstalk interference from the further wire connection j at that tone m.

12. A method according to claim 1, the method further comprising performing a water filling algorithm to jointly optimise the determined power allocation across the allocation of supporting signals to the wire connections.

13. A computer program product stored on a non-transitory computer-readable storage medium and comprising a program or plurality of programs arranged to, when executed by one or more processors, cause the one or more processors to operate in accordance with the method of claim 1.

14. A non-transitory computer-readable storage medium storing one or more programs configured to, when executed by a computer, perform the method according to claim 1.

15. Apparatus for use in a communication system, the communication system comprising a transmitter device and one or more receiver devices, each of the one or more receiver devices being connected to the transmitter device via a respective wire connection, the transmitter device being operable to transmit signals onto the wire connections at one or more different tones, the transmitter device further being operable to transmit signals onto a further wire connection at the one or more different tones, the apparatus comprising:

one or more processors configured to, for each of the one or more tones, allocate signals transmitted on the further wire connection at that tone as supporting signals for a particular wire connection; and measurement means configured to, for each of the one or more tones, measure an electromagnetic coupling between the further wire connection and the particular wire connection to which signals transmitted on the further wire connection at that tone have been allocated as supporting signals; wherein the one or more processors are further configured to:
for each of the one or more tones, using the electromagnetic coupling measurements, determine a power allocation for transmitting a supporting signal on the further wire connection at that tone; and operate the communication system to, for one or more of the tones:
transmit a signal onto the particular wire connection that has been allocated a supporting signal at that tone; and
transmit a supporting signal onto the further wire connection at that tone, thereby to cause crosstalk interference in the particular wire connection transmitting the first signal, wherein a transmission power of the supporting signal is based on the power allocation determined for that supporting signal on the further wire connection at that tone.

16. An apparatus for use in a communication system, the communication system comprising a transmitter device and one or more receiver devices, each of the one or more receiver devices being connected to the transmitter device via a respective wire connection, the transmitter device being operable to transmit signals onto the wire connections at one or more different tones, the transmitter device further being operable to transmit signals onto a further wire connection at the one or more different tones, the apparatus comprising:

one or more processors configured at least to:
for each of the one or more tones, allocate signals transmitted on the further wire connection at that tone as supporting signals for a particular wire connection;

process electromagnetic coupling measurements between the further wire connection and the particular wire connection to which signals transmitted on the further wire connection at that tone have been allocated as supporting signals;

for each of the one or more tones, using the electromagnetic coupling measurements, determine a power allocation for transmitting a supporting signal on the further wire connection at that tone; and operate the communication system to, for one or more of the tones:
transmit a signal onto the particular wire connection that has been allocated a supporting signal at that tone; and
transmit a supporting signal onto the further wire connection at that tone, thereby to cause crosstalk interference in the particular wire connection transmitting the first signal, wherein a transmission power of the supporting signal is based on the power allocation determined for that supporting signal on the further wire connection at that tone.

17. The apparatus according to claim 16, wherein the one or more processors are further configured at least to:
determine a power for transmitting the signal on that wire connection comprising optimizing a power for transmitting the signal on that wire connection based on power contributions from the supporting signals; and
transmit the signal on that wire connection at the determined power.

18. The apparatus according to claim 16, wherein the one or more processors are further configured at least to:
measure a value of a channel transfer function between the further wire connection and the wire connection to thereby measure the electromagnetic coupling between the further wire connection and the wire connection.

19. The apparatus according to claim 16, wherein the further wire connection is not connected between the transmitter device and the one or more receiver devices.

20. The apparatus according to claim 16, wherein the one or more processors are further configured to perform a water filling algorithm to jointly optimize the determined power allocation across the allocation of supporting signals to the wire connections.

* * * * *